US009081497B2

(12) United States Patent
Ohki et al.

(10) Patent No.: US 9,081,497 B2
(45) Date of Patent: Jul. 14, 2015

(54) INFORMATION PROCESSING APPARATUS, INFORMATION PROCESSING METHOD, AND PROGRAM

(75) Inventors: Yoshihito Ohki, Tokyo (JP); Ritsuko Kano, Tokyo (JP); Akihiro Komori, Tokyo (JP); Reiko Miyazaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 845 days.

(21) Appl. No.: 13/170,358

(22) Filed: Jun. 28, 2011

(65) Prior Publication Data

US 2012/0054688 A1   Mar. 1, 2012

(30) Foreign Application Priority Data

Aug. 24, 2010 (JP) ................... 2010-187370

(51) Int. Cl.
 G06F 3/048 (2013.01)
 G06F 3/0488 (2013.01)
(52) U.S. Cl.
 CPC .................. G06F 3/04883 (2013.01)
(58) Field of Classification Search
 CPC ........................................................ G06F 3/00
 USPC ........................................ 715/234, 724, 838
 See application file for complete search history.

(56) References Cited

U.S. PATENT DOCUMENTS

| | | | |
|---|---|---|---|
| 5,872,559 A * | 2/1999 | Shieh | 345/157 |
| 6,309,305 B1 * | 10/2001 | Kraft | 455/566 |
| 7,853,888 B1 * | 12/2010 | Dhawan et al. | 715/770 |
| 2003/0142227 A1 * | 7/2003 | van Zee | 348/333.1 |
| 2004/0174399 A1 * | 9/2004 | Wu et al. | 345/863 |
| 2005/0138554 A1 * | 6/2005 | Bell et al. | 715/530 |
| 2006/0150087 A1 * | 7/2006 | Cronenberger et al. | 715/513 |
| 2006/0218492 A1 * | 9/2006 | Andrade | 715/523 |
| 2007/0182973 A1 * | 8/2007 | Godley | 358/1.6 |
| 2008/0143684 A1 * | 6/2008 | Seo | 345/173 |
| 2009/0140998 A1 * | 6/2009 | Jung et al. | 345/173 |
| 2012/0304132 A1 * | 11/2012 | Sareen et al. | 715/863 |

FOREIGN PATENT DOCUMENTS

JP   2006-39745   2/2006

OTHER PUBLICATIONS

Microsoft Word 2007 Bible, Herb Tyson, Mar. 12, 2007, pp. 116, 166-168, 304 and 305.*
Microsoft Office 2008 for Mac Bible, Gunter et al., Apr. 13, 2009, pp. 111, 112.*

* cited by examiner

*Primary Examiner* — Matthew Ell
(74) *Attorney, Agent, or Firm* — Hazuki International, LLC

(57) ABSTRACT

There is provided an information processing apparatus including a press-down detection unit for detecting a press-down operation, and an information processing unit for performing, in a case a plurality of press-down operations are successively detected by the press-down detection unit in a state where first information and second information related to the first information are held, a paste operation of the first information by a first press-down operation and processing according to the second information by a second press-down operation following the first operation.

4 Claims, 22 Drawing Sheets

FIG.3
COPY OPERATION
<STEP 1>
PRESS DOWN AT STARTING POINT
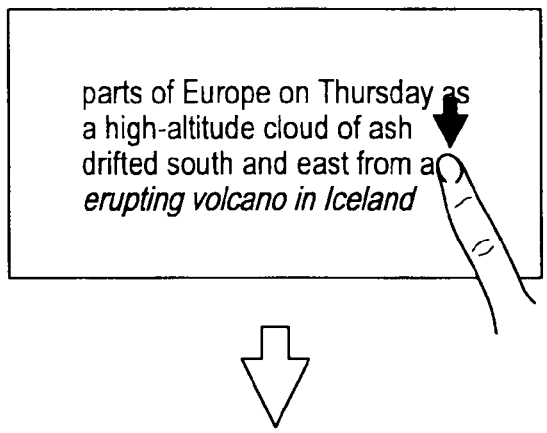
<STEP 2>
TRACE AREA TO BE SELECTED
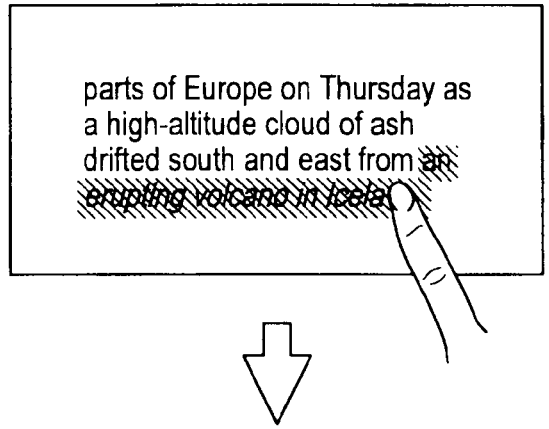
<STEP 3>
REMOVE FINGER
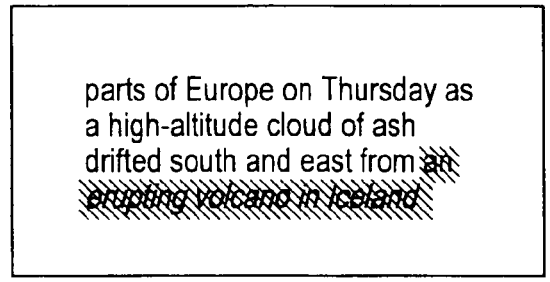
(COPY TEXT AND FORMAT)

FIG.4
CUT OPERATION
<Step 1> - <Step 3> (COPY OPERATION)
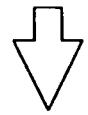
<STEP 4>
PRESS DOWN SELECTED
AREA AGAIN
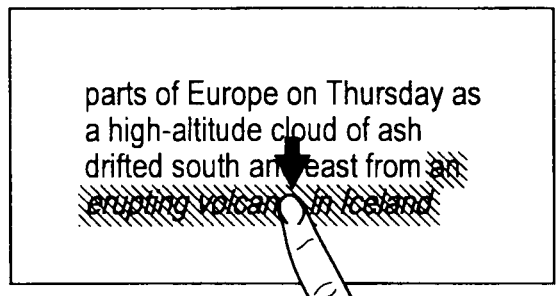
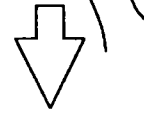
<STEP 5>
REMOVE FINGER
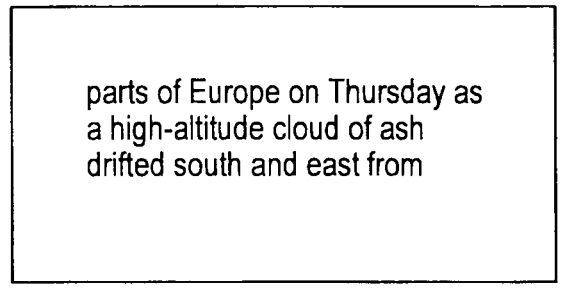
(DELETE TEXT)

FIG.5
PASTE OPERATION 1
<STEP 1>
PRESS DOWN AT DESIRED
POSITION OF PASTE
Cancellations List
Here is a list of airports than have been affected by a cloud of ash from 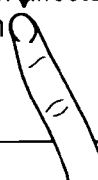
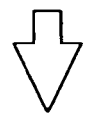
<STEP 2>
REMOVE FINGER
Cancellations List
Here is a list of airports than have been affected by a cloud of ash from an erupting volcano in Iceland
(PASTE TEXT)

FIG.6

PASTE OPERATION 2

<Step 1> - <Step 2> (PASTE OPERATION 1)

⇩

<STEP 3>
PRESS DOWN PASTED
TEXT AGAIN

Cancellations List

Here is a list of airports than have been affected by a cloud of ash from an erupting volcano in Iceland

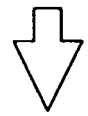

⇩

<STEP 4>
REMOVE FINGER

Cancellations List

Here is a list of airports than have been affected by a cloud of ash from an erupting volcano in Iceland (PASTE FORMAT)

FIG.7
PASTE OPERATION 3
<Step 1> - <Step 4> (PASTE OPERATIONS 1, 2)
⇩
<STEP 5>
PRESS DOWN PASTED TEXT
WITH FORMAT AGAIN
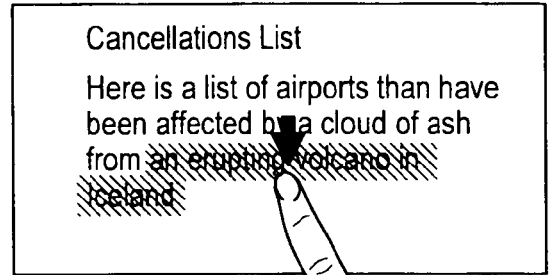
⇩
<STEP 6>
REMOVE FINGER
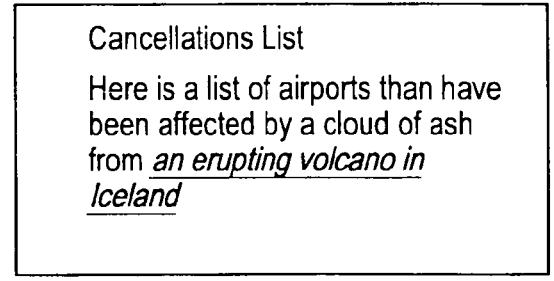
(PASTE LINK INFORMATION)

FIG.8

(EXAMPLE OF CORRESPONDENCE BETWEEN OPERATIONS AND BEHAVIOURS)

|  |  | SELECT OPERATION | COPY OPERATION (1ST) | COPY OPERATION (2ND) | PASTE OPERATION (1ST) | PASTE OPERATION (2ND) | PASTE OPERATION (3RD) |
|---|---|---|---|---|---|---|---|
| ASSIGNED ACTION | 1 | PRESS-DOWN + DRAG | PRESS DOWN ON SELECTED OBJECT |  | PRESS DOWN AT INSERTION POSITION | PRESS DOWN ON PASTED OBJECT |  |
| BEHAVIOUR PATTERN | 1 |  | COPY LIGHT DATA | COPY HEAVY DATA AS WELL | PASTE ALL | N/A | N/A |
|  | 2 | SELECT OBJECT | COPY HEAVY DATA AS WELL | N/A | PASTE LIGHT DATA | PASTE HEAVY DATA | DELETE HEAVY DATA |
|  | 3 |  | COPY HEAVY DATA AS WELL | CUT | PASTE LIGHT DATA | PASTE HEAVY DATA | DELETE HEAVY DATA |

FIG.9

(EXAMPLE OF CORRESPONDENCE BETWEEN OPERATIONS AND OPERATION TARGETS)

|  | | 1ST OPERATION (LIGHT DATA) | 2ND OPERATION (HEAVY DATA) |
|---|---|---|---|
| TEXT | | PLAIN TEXT | FORMATTED TEXT |
| | | PLAIN TEXT | TEXT WITH LINK INFORMATION |
| IMAGE | | IMAGE WITHOUT METADATA * | IMAGE WITH METADATA * |
| | | THUMBNAIL | IMAGE |
| SHORTCUT | | SHORTCUT | FILE |

* POSITION INFORMATION, ETC.

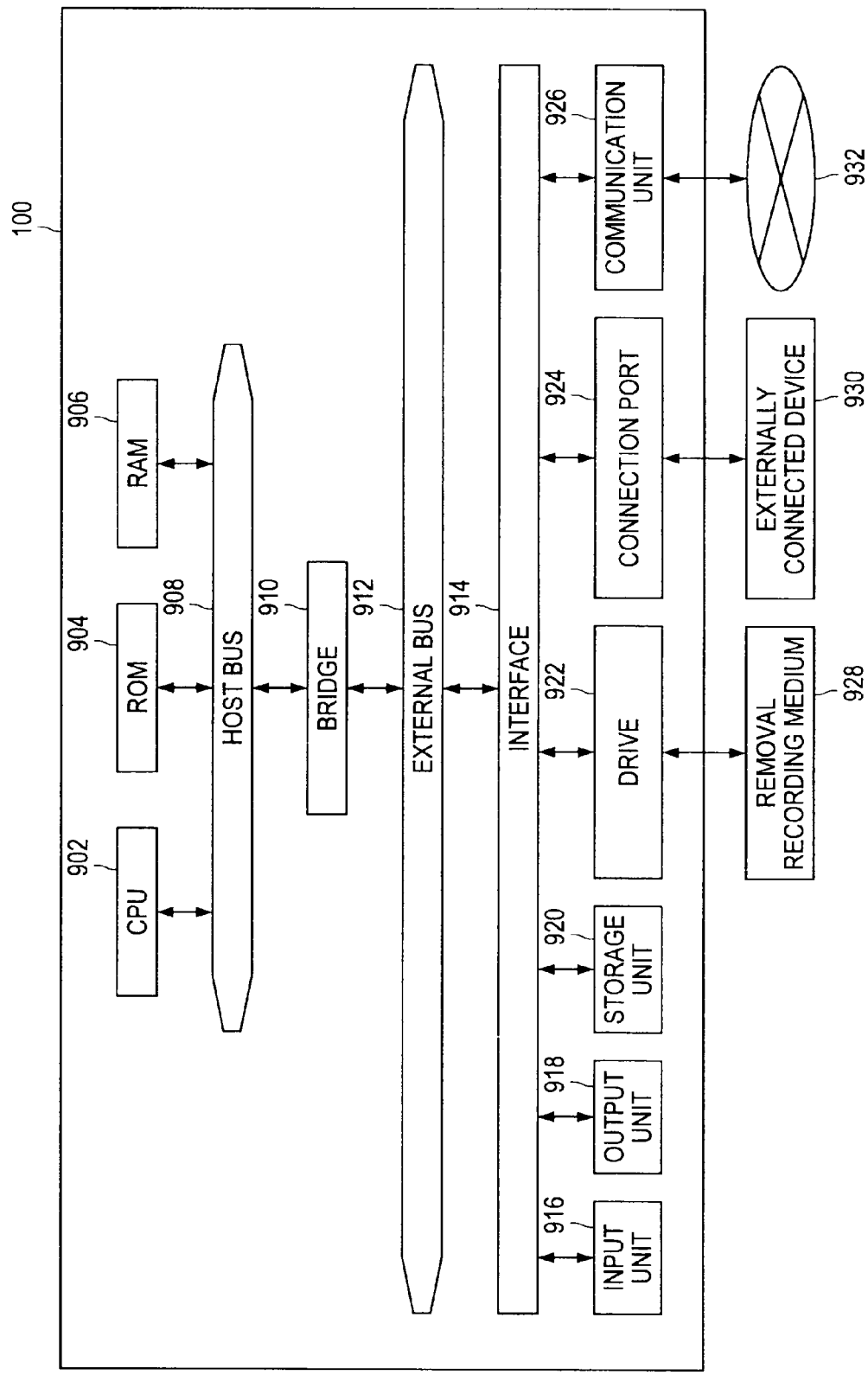

INFORMATION PROCESSING APPARATUS, INFORMATION PROCESSING METHOD, AND PROGRAM

BACKGROUND

The present disclosure relates to an information processing apparatus, an information processing method, and a program.

In recent years, many small electronic appliances are provided with a touch panel as an input device used for inputting information or performing operation of a graphical user interface (hereinafter, a GUI). By using the touch panel, separate input means such as a keyboard becomes unnecessary, and an electronic appliance can be made smaller to that extent. Furthermore, the touch panel is also a display device on which an image, the GUI or the like is displayed. Accordingly, by using the touch panel, an intuitive operation system of directly touching and operating the image, the GUI or the like displayed on the touch panel can be realized. Owing to these characteristics, the touch panel is provided in various electronic appliances such as a portable information terminal, a mobile phone, a car navigation system, a notebook personal computer and an information appliance, for example.

As described, the touch panel has a function of an input device and a function of a display device. The function of a display device is realized by using a display panel such as a liquid crystal display panel (hereinafter, an LCD panel), an organic electro-luminescent display panel (hereinafter, an OLED panel) or the like, for example. On the other hand, the function of an input device is realized by providing, on a display panel, a capacitive sensor or an optical sensor which is for optically scanning the position of an operating tool that is neared or brought into contact with the surface of the display panel, for example. For example, JP 2006-39745A discloses, in relation to such a touch panel, a technology related to an operation system that uses a touch panel capable of detecting the intensity of pressure. Particularly, the patent document discloses a technology for realizing a multistage selection input according to the intensity of pressure.

SUMMARY

It is true that using a touch panel which is capable of detecting the intensity of pressure enables to realize a highly convenient operation system. However, in reality, a highly convenient operation system is not necessarily realized in an electronic appliance equipped with such touch panel. For example, as a frequently used operation, there are copy and paste operations of data. In the case of an electronic appliance equipped with input means such as a keyboard, the copy and paste operations can be easily realized by using shortcut keys. However, when using a touch panel as the input means, an operation of calling menu items or selecting menu items corresponding to the copy and paste operations becomes necessary, for example.

Furthermore, in a case data that is the target of the copy and paste operations includes a plurality of pieces of information, one may want to copy a part of the information, copy the whole information, paste a part of the information, or paste the whole information. Also, one may want to have a plurality of pieces of information copied in advance, and then paste in stages the plurality of pieces of information that have been copied. In such a case, a user has to perform operations of selecting a menu item for performing a copy operation, and, then, selecting which information is to be copied, and actually copying the information. Likewise for the paste operation, an operation of pasting desired information is realized through a plurality of operational steps. As such, it is hard to say that a highly convenient operation system is realized in an electronic appliance with a touch panel as the input means.

In light of the foregoing, it is desirable to provide an information processing apparatus, an information processing method and a program which are novel and improved, and which are capable of realizing an operation system that uses input means capable of detecting a press-down operation of an operating tool and that is capable of processing a plurality of pieces of related information in stages with a small number of operational steps.

According to an embodiment of the present disclosure, there is provided an information processing apparatus which includes a press-down detection unit for detecting a press-down operation, and an information processing unit for performing, in a case a plurality of press-down operations are successively detected by the press-down detection unit in a state where first information and second information related to the first information are held, a paste operation of the first information by a first press-down operation and processing according to the second information by a second press-down operation following the first operation.

The information processing apparatus may further include an information holding unit for holding text data as the first information and holding, as the second information, format information indicating a format added to the text data. In this case, the information processing unit performs the paste operation of the text data held in the information holding unit by the first press-down operation and causes the format indicated by the format information held in the information holding unit to be reflected on the text data by the second press-down operation following the first operation.

The information processing unit may perform, by a (k+1)-th press-down operation following a k-th (k≥2) operation, predetermined processing according to (k+1)-th information related to the first information.

The information processing apparatus may further include an information holding unit for holding text data as the first information and holding, as k-th information (k≥2), (k−1)-th format information indicating a (k−1)-th format added to the text data. In this case, a plurality of formats added to the text data are different from each other, and the information processing unit causes, by the first press-down operation, the text data held in the information holding unit to be displayed on a screen, and causes, by a k-th (k≥2) press-down operation, the (k−1)-th format indicated by the (k−1)-th format information held in the information holding unit to be reflected on the text data.

A first format added to the text data may be a format including one or more of a type of font, a size of a character, a colour of a character and a typeface of a character, and a second format added to the text data may be a format for indicating that the text data is a link. In this case, second format information includes link information indicating a predetermined link destination, and, in a case a third press-down operation is performed, the information processing unit causes the second format to be reflected on the text data and sets the link information in the text data.

The information processing apparatus may further include an information holding unit for holding image data as the second information and holding thumbnail data of the image data as the first information. In this case, the information processing unit causes, by the first press-down operation, the thumbnail data held in the information holding unit to be displayed on a screen, and replaces, by the second press-down operation following the first operation, the thumbnail data by the image data held in the information holding unit.

The information processing apparatus may further include an information holding unit for holding, as the first information, link information to image data and holding, as the second information, thumbnail data of the image data. In this case, the information processing unit causes, by the first press-down operation, the thumbnail data held in the information holding unit to be displayed on a screen, and sets in the thumbnail data, by the second press-down operation following the first operation, link information to the image data held in the information holding unit.

According to another embodiment of the present disclosure, there is provided an information processing apparatus which includes a press-down detection unit for detecting a press-down operation, and an information processing unit for performing, in a case a plurality of press-down operations are successively detected by the press-down detection unit in a state where first information is selected, a copy operation of the first information by a first press-down operation and a copy operation of second information, which is ancillary to the first information, by a second press-down operation following the first press-down operation.

The first information may be text data. The second information may be format information indicating a format added to the text data.

The first information may be image data. The second information may be a thumbnail of the image data.

The information processing unit may delete the first information from a screen by a third press-down operation following the second press-down operation.

According to another embodiment of the present disclosure, there is provided an information processing method performed by an information processing apparatus including a press-down detection unit for detecting a press-down operation, which includes performing, in a case a plurality of press-down operations are successively detected by the press-down detection unit in a state where first information and second information related to the first information are held, a paste operation of the first information by a first press-down operation and processing according to the second information by a second press-down operation following the first operation.

According to another embodiment of the present disclosure, there is provided an information processing method performed by an information processing apparatus including a press-down detection unit for detecting a press-down operation, which includes performing, in a case a plurality of press-down operations are successively detected by the press-down detection unit in a state where first information is selected, a copy operation of the first information by a first press-down operation and a copy operation of second information, which is ancillary to the first information, by a second press-down operation following the first press-down operation.

According to another embodiment of the present disclosure, there is provided a program for causing a computer to realize a press-down detection function of detecting a press-down operation, and an information processing function of performing, in a case a plurality of press-down operations are successively detected by the press-down detection function in a state where first information and second information related to the first information are held, a paste operation of the first information by a first press-down operation and processing according to the second information by a second press-down operation following the first operation.

According to another embodiment of the present disclosure, there is provided a program for causing a computer to realize a press-down detection function of detecting a press-down operation, and an information processing function of performing, in a case a plurality of press-down operations are successively detected by the press-down detection function in a state where first information is selected, a copy operation of the first information by a first press-down operation and a copy operation of second information, which is ancillary to the first information, by a second press-down operation following the first press-down operation.

According to another embodiment of the present disclosure, there is provided a computer-readable recording medium in which the program is recorded.

According to the embodiments of the present disclosure described above, it is possible to realize an operation system that uses input means capable of detecting a press-down operation of an operating tool and that is capable of processing a plurality of pieces of related information in stages with a small number of operational steps.

BRIEF DESCRIPTION OF THE DRAWINGS

FIG. 3 is an explanatory diagram for describing a copy operation according to an embodiment of the present disclosure;

FIG. 4 is an explanatory diagram for describing a cut operation according to the embodiment;

FIG. 5 is an explanatory diagram for describing a paste operation according to the embodiment;

FIG. 6 is an explanatory diagram for describing a paste operation according to the embodiment;

FIG. 7 is an explanatory diagram for describing a paste operation according to the embodiment;

FIG. 8 is an explanatory diagram for describing a correspondence relationship between operations and behaviours with regard to copy and paste operations according to the embodiment;

FIG. 9 is an explanatory diagram for describing a correspondence relationship between operations and operation targets with regard to the copy and paste operations according to the embodiment;

FIG. 23 is an explanatory diagram for describing a hardware configuration capable of realizing a function of the information processing apparatus according to the embodiment.

DETAILED DESCRIPTION OF THE EMBODIMENT(S)

Figure 1:
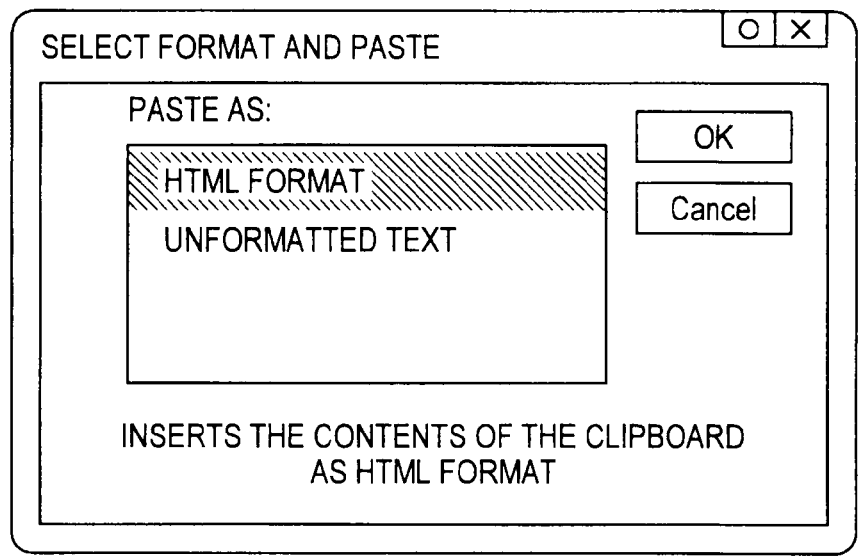
FIG. 1 is an explanatory diagram for describing a general paste operation.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Flow of Explanation

The flow of explanation on an embodiment of the present disclosure which will be described below will be briefly stated here. First, general paste operations will be described with reference to FIGS. 1 and 2.

Figure 10:
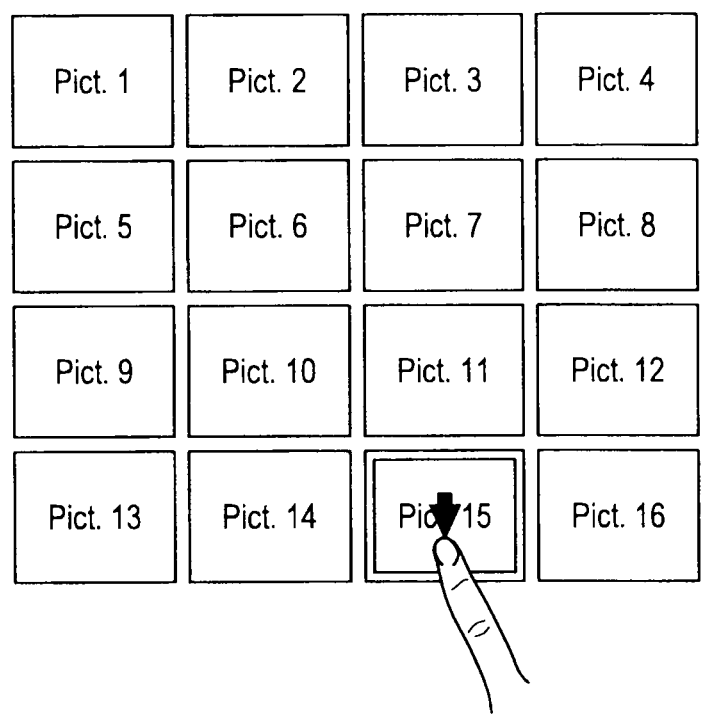
FIG. 10 is an explanatory diagram for describing a copy operation according to an example application of the embodiment.

Next, a copy operation according to the embodiment will be described with reference to FIG. 3. Next, a cut operation according to the embodiment will be described with reference to FIG. 4. Then, paste operations according to the embodiment will be described with reference to FIGS. 5 to 7. Then, a correspondence relationship between operations and behaviours with regard to copy and paste operations according to the embodiment will be described with reference to FIG. 8. Then, a correspondence relationship between operations and operation targets with regard to the copy and paste operations according to the embodiment will be described with reference to FIG. 9. Then, a copy operation according to an example application of the embodiment will be described with reference to FIG. 10.

Next, a functional configuration of an information processing apparatus 100 capable of realizing the copy and paste operations according to the embodiment will be described with reference to FIG. 11. Then, operations of the information processing apparatus 100 according to the embodiment will be described with reference to FIGS. 12 to 22. Then, a hardware configuration capable of realizing a function of the information processing apparatus 100 according to the embodiment will be described with reference to FIG. 23. Lastly, technical ideas of the embodiment will be summarized and effects obtained by the technical ideas will be briefly described.

DESCRIPTION ITEMS

1: Introduction (General Paste Operation)
2: Embodiment
  2-1: Copy Operation of Text
  2-2: Cut Operation of Text
  2-3: Paste Operation of Text
    2-3-1: Paste of Text
    2-3-2: Paste of Format
    2-3-3: Paste of Link Information
  2-4: Example Application
  2-5: Functional Configuration of Information Processing Apparatus 100
  2-6: Operation of Information Processing Apparatus 100
    2-6-1: Two-Stage Copy of Text
    2-6-2: Two-Stage Copy+Cut of Text
    2-6-3: Three-Stage Copy of Text
    2-6-4: Two-Stage Copy of Image 1
    2-6-5: Two-Stage Copy of Image 2
    2-6-6: Three-Stage Copy of Image
    2-6-7: Two-Stage Paste of Text
    2-6-8: Three-Stage Paste of Text
    2-6-9: Two-Stage Paste of Image 1
    2-6-10: Two-Stage Paste of Image 2
    2-6-11: Three-Stage Paste of Image
  2-7: Hardware Configuration
3: Summary

1: Introduction

General Paste Operation

Figure 2:
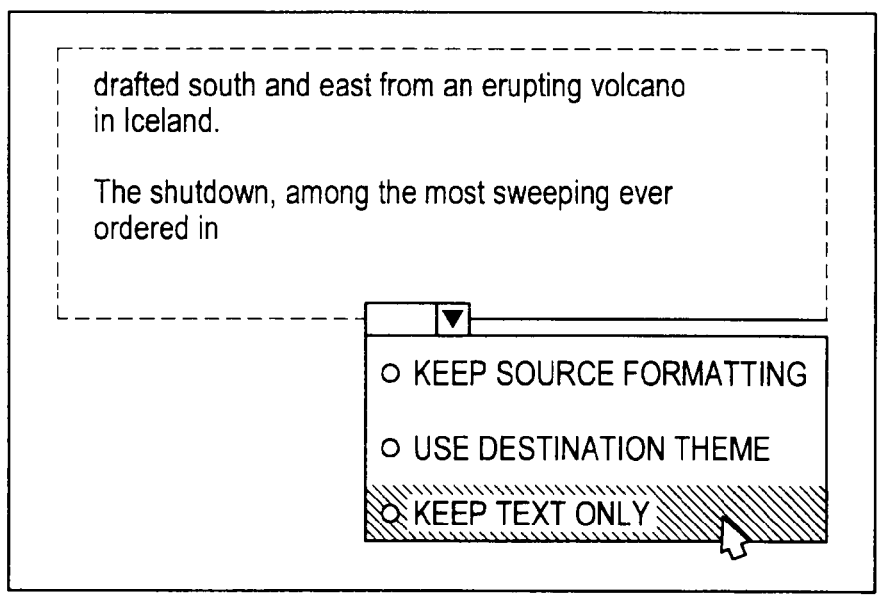
FIG. 2 is an explanatory diagram for describing a general paste operation.

Before describing the embodiment of the present disclosure in detail, a general paste operation will be briefly described. In the following, general paste operations will be described with reference to FIGS. 1 and 2. FIGS. 1 and 2 are explanatory diagrams for describing general paste operations.

In a computer system, a function called copy and paste is widely used. This function is for caching data by a copy operation and outputting the cached data by a paste operation. When using the copy and paste, an operation of copying a part of certain text and pasting the same into another text, for example, can be easily realized. However, if there is an attribute or additional data that is ancillary to data that is the target of copy and paste, the operation of copy and paste will be complicated.

For example, when formatted text is copied but a user wants to paste only plain text, the user has to display a menu screen as shown in FIG. 1 and select plain text (unformatted text) from the displayed menu screen. Accordingly, it is necessary, just to paste plain text, to go through many operational steps, such as displaying a pull-down menu, selecting a desired menu item from the pull-down menu and selecting an item related to the paste target from the menu screen. Furthermore, to enable paste of text that reflects only a part of the format (for example, typeface or font), the structure of the menu screen has to be further complicated, or the operational steps have to be further increased.

According to a general paste operation, in the case of pasting data including ancillary data, the operational steps will increase and, also, the operation will be complicated. Accordingly, the operation system has to be refined so as to include less operational steps and to enable simple and highly free pasting. Furthermore, in the case of a paste operation using a menu screen as shown in FIG. 1, a user is not allowed to check the result of pasting in advance. Therefore, a user is forced to select a menu item without checking the result of pasting.

An operation system as shown in FIG. 2 was devised in view of the circumstances described above. The operation system shown in FIG. 2 enables to change, after pasting, the type of data that is to be made ancillary to the pasted data. When using this operation system, it becomes possible to fix the result of pasting after checking the result of pasting. However, as shown in FIG. 2, an operation of selecting ancillary data from menu items becomes necessary after pasting. The operational steps are few compared to the example of FIG. 1, but the operational steps are still complicated. Furthermore, since selection of a menu item is requested after pasting, a user who is not used to this operation system will experience an odd feeling.

For these reasons, a refinement for realizing simple and highly intuitive copy and paste operations with a small number of operational steps is desired. Accordingly, the present inventors have devised an operation system for realizing highly convenient copy and paste operations that uses a touch panel.

2: Embodiment

In the following, an embodiment of the present disclosure will be described. The present embodiment relates to an operation system that uses a touch panel. Particularly, the present embodiment relates to a technology for realizing intuitive and highly convenient copy and paste operations with a small number of operational steps.

[2-1: Copy Operation of Text]

First, a copy operation of text according to the present embodiment will be described with reference to FIG. 3. FIG. 3 is an explanatory diagram for describing a copy operation of text according to the present embodiment. The copy operation of text according to the present embodiment includes an operation of selecting text desired to be copied and an operation of copying the selected text.

As shown in FIG. 3, first, a user presses down with a finger with predetermined pressure or higher (Step 1). Next, the user drags the pressing finger (Step 2). When these operations are performed, the text in the range specified by the finger which has been dragged in Step 2 will be in a selected state. Then, after pressing down with the finger with predetermined pressure or higher, the user removes the finger from the screen at the same position (Step 3). When this operation is performed, the text which has been placed in the selected state in Step 2 is copied. At this time, plain text and a format are copied.

[2-2: Cut Operation of Text]

Next, a cut operation of text according to the present embodiment will be described with reference to FIG. 4. FIG. 4 is an explanatory diagram for describing a cut operation of text according to the present embodiment. The copy operation of text according to the present embodiment includes an operation of selecting text desired to be copied, an operation of copying the selected text, and an operation of deleting the copied text.

First, a user performs the same operations as Steps 1 to 3 shown in FIG. 3. As described above, when the operation of Step 3 is performed, the plain text and the format are copied. Then, the user presses down again the text that is in the selected state (Step 4). Then, the user removes the pressing finger from the screen (Step 5). When this operation is performed, the text which has been selected in Step 2 is deleted from the screen. The cut operation is performed subsequent to the copy operation described above in this manner.

[2-3: Paste Operation of Text]

Next, paste operations of text according to the present embodiment will be described with reference to FIGS. 5 to 7. Additionally, it is assumed that plain text, a format and link information have been copied.

(2-3-1: Paste of Text)

First, FIG. 5 will be referred to. FIG. 5 is an explanatory diagram for describing a paste operation of plain text according to the present embodiment. As shown in FIG. 5, first, a user presses down with a finger at a position where pasting is desired (Step 1). Then, the user removes the finger from the screen at the pressed position (Step 2). When this operation is performed, plain text which has been copied in advance is displayed on the screen.

(2-3-2: Paste of Format)

Next, FIG. 6 will be referred to. FIG. 6 is an explanatory diagram for describing a paste operation of formatted text according to the present embodiment. As shown in FIG. 6, first, a user performs the same operations as Steps 1 and 2 shown in FIG. 5. As described above, when the operation of Step 2 is performed, plain text is displayed on the screen. Then, the user presses down again the plain text displayed on the screen (Step 3). Then, the user removes the pressing finger from the screen (Step 4). When this operation is performed, a format is reflected on the plain text which has been displayed in Step 2.

(2-3-3: Paste of Link Information)

Next, FIG. 7 will be referred to. FIG. 7 is an explanatory diagram for describing a paste operation of text with link information according to the present embodiment. As shown in FIG. 7, a user performs the same operations as Steps 1 to 4 shown in FIGS. 5 and 6. As described above, when the operation of Step 4 is performed, formatted text is displayed on the screen. Then, the user presses down again the formatted text displayed on the screen (Step 5). Then, the user removes the pressing finger from the screen (Step 6). When this operation is performed, link information is added to the text on which a format which has been reflected in Step 4.

[2-4: Example Application]

In the foregoing, the operation system for the copy and paste operations according to the present embodiment has been concretely described. The copy and paste operations of text have been taken as examples here, but the operation system described above can be applied to copy and paste operations of arbitrary data. Particularly, application to an operation of copying and pasting a plurality of types of related data (light data, heavy data) in stages is possible. The light data here may be plain text, an image without metadata, a thumbnail, a shortcut or the like, for example. Also, the heavy data here may be formatted text, text with link information, an image with metadata, an original image, a real file or the like, for example.

Correspondence Relationship Between Operations and Behaviours

For example, a correspondence relationship between operations and behaviours (processing contents) as shown in FIG. 8 is conceivable.

First, we will focus on the column of select operation shown in FIG. 8. An action (operation) assigned to the select operation is an operation of dragging after pressing down. Also, a behaviour pattern (processing contents) performed when this select operation is performed is selection of an object. That is, when dragging is performed after pressing down, an object specified by dragging is selected.

Next, we will focus on a combination of copy operations (first and second). An action assigned to the copy operation is a press-down operation of a selected object.

First, we will focus on behaviour pattern 1. In the case of behaviour pattern 1, processing of copying light data is associated with the copy operation (first). Also, processing of also copying heavy data is associated with the copy operation (second). That is, in the case of behaviour pattern 1, if the copy operation is performed once, only light data is copied, and if the copy operation is performed twice, heavy data is also copied.

Next, we will focus on behaviour pattern 2. In the case of behaviour pattern 2, processing of copying both light data and heavy data is associated with the copy operation (first). On the other hand, processing of copying is not associated with the copy operation (second). That is, in the case of behaviour pattern 2, if the copy operation is performed once, light data and heavy data are copied.

Next, we will focus on behaviour pattern 3. In the case of behaviour pattern 3, processing of copying both light data and heavy data is associated with the copy operation (first). Also, processing of cutting is associated with the copy operation (second). That is, in the case of behaviour pattern 3, if the copy operation is performed once, both light data and heavy data are copied, and if the copy operation is performed twice, cutting is performed.

Next, we will focus on a combination of paste operations (first, second and third). An action assigned to the paste operation (first) is a press-down operation at a position where pasting is desired. Actions assigned to the paste operations (second and third) are press-down operations of the pasted object.

First, we will focus on behaviour pattern 1. In the case of behaviour pattern 1, processing of pasting all of light data and heavy data is associated with the paste operation (first). Also, no processing is associated with the paste operations (second and third). That is, in the case of behaviour pattern 1, if the paste operation is performed once, light data and heavy data are pasted.

Next, we will focus on behaviour patterns 2 and 3. In the case of behaviour patterns 2 and 3, processing of pasting light data is associated with the paste operation (first). Also, processing of pasting heavy data is associated with the paste operation (second). Furthermore, processing of deleting the pasted heavy data is associated with the paste operation (third). That is, in the case of behaviour pattern 2, if the paste operation is performed once, light data is pasted, if the paste operation is performed twice, heavy data is pasted, and if the paste operation is performed three times, the pasted heavy data is deleted.

Additionally, if behaviour patterns 2 and 3 are extended, an operation system is also realized where, if the paste operation is performed 2N times (N≥1), heavy data is pasted and if the paste operation is performed 2N+1 times, the heavy data is deleted.

As described, various actions and behaviours can be associated with the select operation, the copy operation and the paste operation. As describe above, the operation system according to the present embodiment has a characteristic in that light data and heavy data are copied in stages, or the light data and the heavy data are pasted in stages. The operation system according to the present embodiment also has a characteristic in that operations of deleting heavy data which has been pasted and pasting the heavy data again can be realized by repeating the press-down operation. Additionally, the present embodiment is not limited to the example of FIG. 8.

Correspondence Relationship Between Operations and Operation Targets

Next, a combination of data which can be the target of the copy and paste operations according to the present embodiment will be described with reference to FIG. 9 while taking concrete examples.

As described above, the copy and paste operations according to the present embodiment can be applied to copy and paste of text. In this case, the light data is plain text. On the other hand, the heavy data is formatted text or text with link information. Also, the copy and paste operations according to the present embodiment can be applied to copy and paste of an image (see FIG. 10). In this case, the light data is an image without metadata or a thumbnail. On the other hand, the heavy data is an image with metadata or an original image. Additionally, the metadata here is position information, time information or the like of shooting. Furthermore, the copy and paste operations according to the present embodiment can be applied to copy and paste of a file. In this case, the light data is a shortcut. On the other hand, the heavy data is an original file.

The combinations of data shown in FIG. 9 are only examples, but the copy and paste operations according to the present embodiments can be applied to copy and paste of various types of data in this manner.

[2-5: Functional Configuration of Information Processing Apparatus 100]

Here, a functional configuration of an information processing apparatus 100 capable of realizing the copy and paste operations according to the present embodiment described above will be described with reference to FIG. 11. FIG. 11 is an explanatory diagram for describing a functional configuration of the information processing apparatus 100 according to the present embodiment.

Figure 11:
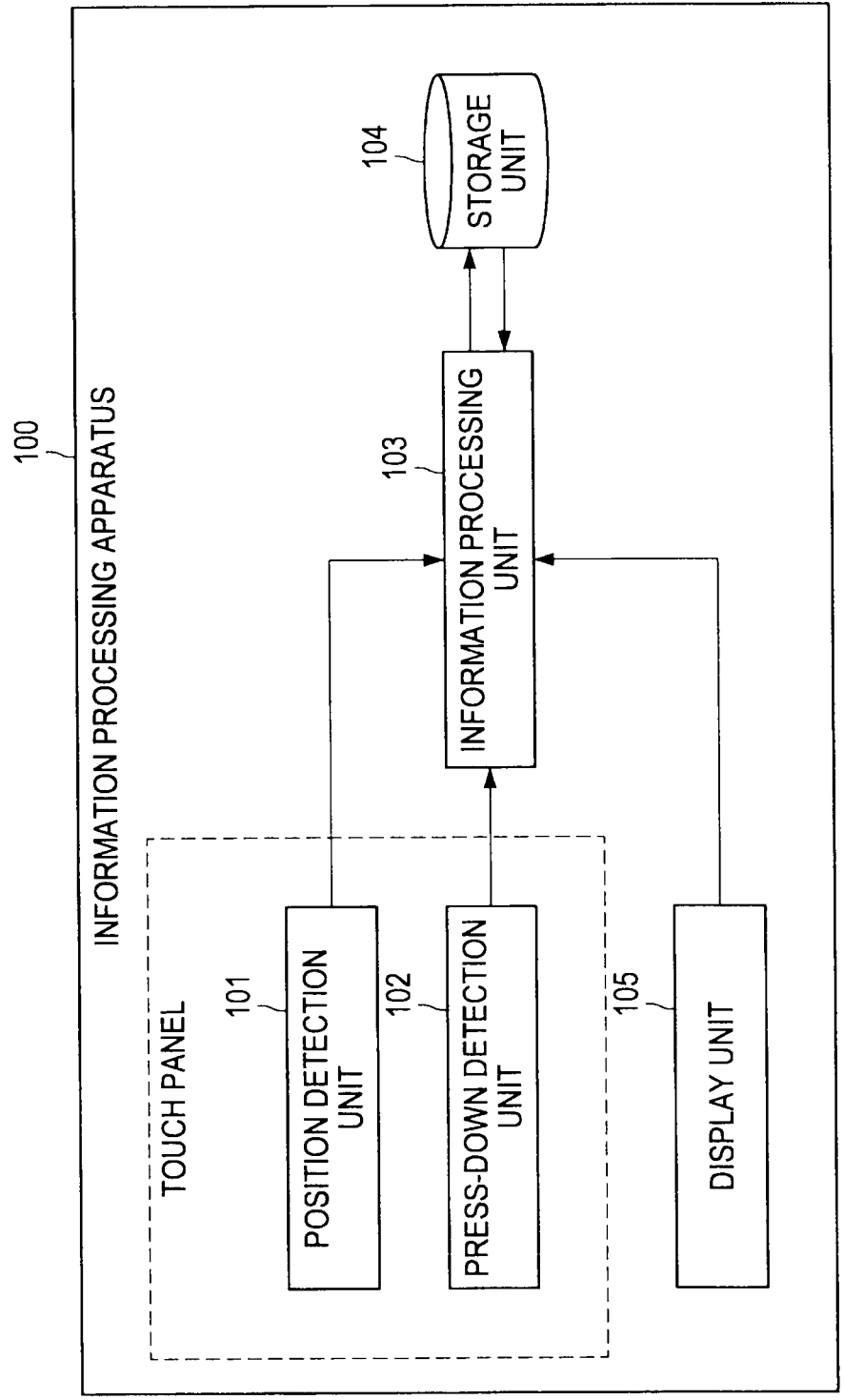
FIG. 11 is an explanatory diagram for describing a functional configuration of an information processing apparatus according to the embodiment.

As shown in FIG. 11, the information processing apparatus 100 is configured mainly from a position detection unit 101, a press-down detection unit 102, an information processing unit 103, a storage unit 104 and a display unit 105. Additionally, the position detection unit 101, the press-down detection unit 102 and the display unit 105 form a touch panel. For example, a capacitive touch panel or an optical touch panel can be used as this touch panel.

The capacitive touch panel is a touch panel capable of detecting a change in capacitance caused at the time of an operating tool such as a finger nearing or contacting the surface of the touch panel and detecting, from the change in capacitance, the position of the operating tool, the proximity distance, the press-down force or the like. The optical touch panel is a touch panel capable of detecting an operating tool which has neared or contacted the touch panel by using an optical sensor and detecting the position of the operating tool, the proximity distance, the pressing force or the like. For example, an optical touch panel called an in-cell type can detect the position of an operating tool, the proximity distance and the press-down force (estimated from the contact area of the operating tool) by emitting light on the operating tool from within the touch panel and detecting the light reflected by the operating tool by an optical array sensor.

Now, the position detection unit 101 is means for detecting the position of an operating tool that has neared or contacted the touch panel. For example, in the case a capacitive touch panel is used, the position detection unit 101 detects the position at which the capacitance has changed according to the nearing or contacting of the operating tool. Position information indicating the position of the operating tool detected by the position detection unit 101 is input to the information processing unit 103.

Furthermore, the press-down detection unit 102 is means for detecting, at the time the touch panel is strongly pressed by the operating tool, the change in the pressure and detecting the press-down operation of the operating tool. Additionally, in the case a capacitive touch panel is used, the press-down detection unit 102 can detect the press-down operation by determining whether the capacitance has exceeded a predetermined threshold or not. Press-down information indicating the press-down operation detected by the press-down detection unit 102 is input to the information processing unit 103.

The information processing unit 103 is means for processing data based on the position information input by the position detection unit 101 and the press-down information input by the press-down detection unit 102. For example, the information processing unit 103 causes the display unit 105 to display text or an image. Furthermore, the information processing unit 103 copies the data of the text or the image displayed on the display unit 105, or cuts or pastes the copied data. That is, the information processing unit 103 changes the display state of the text or the image displayed on the display unit 105, stores the data of the text or the image in the storage unit 104, or reads the data stored in the storage unit 104 and causes the display unit 105 to display the same.

The storage unit 104 is storage means for storing data. Also, the display unit 105 is display means for displaying text or an image. Additionally, the function of the information processing unit 103 is realized by the function of a CPU 902 using a program recorded on a ROM 904, a RAM 906, a storage unit 920, a removable recording medium 928 or the like among the hardware configuration described later. Also, the function of the storage unit 104 is realized by the function of the RAM 906, the storage unit 920, the removable recording medium 928 or the like.

In the foregoing, a functional configuration of the information processing apparatus 100 has been described.

[2-6: Operation of Information Processing Apparatus 100]

Next, operations of the information processing apparatus 100 will be described with reference to FIGS. 12 to 22.

(2-6-1: Two-Stage Copy of Text)

Figure 12:
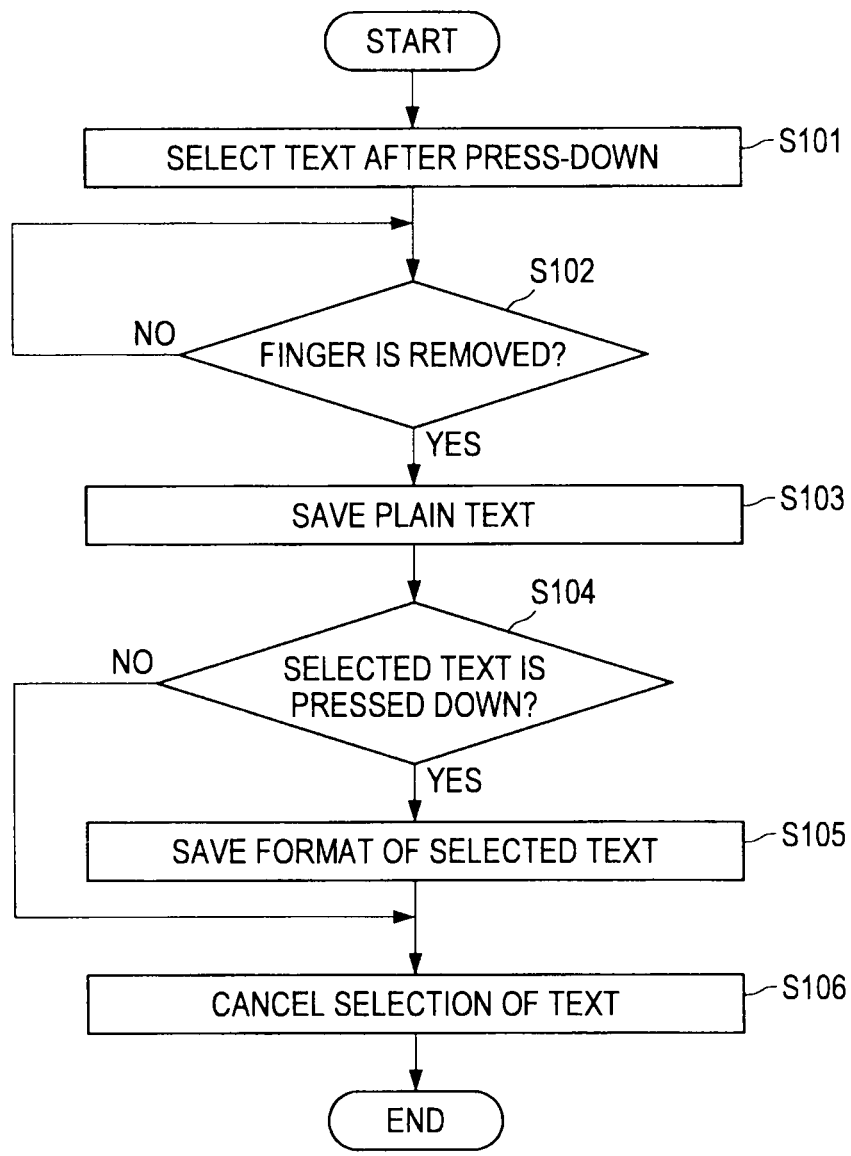
FIG. 12 is an explanatory diagram for describing an operation of the information processing apparatus according to the embodiment (two-stage copy of text)

First, FIG. 12 will be referred to. FIG. 12 is an explanatory diagram for describing an operation of the information processing apparatus 100 related to two-stage copy of text.

As shown in FIG. 12, first, a press-down operation is performed by a user, and text is selected by a drag operation (S101). At this point, the press-down operation is detected by the press-down detection unit 102, and press-down information is input to the information processing unit 103. Also, the range specified by the drag operation is detected by the position detection unit 101, and position information indicating the range is input to the information processing unit 103. Then, the text within the range specified by the drag operation is selected by the information processing unit 103.

Next, the information processing unit 103 determines based on the position information input from the position detection unit 101 and the press-down information input from the press-down detection unit 102 whether the finger is removed from the touch panel or not (S102). In the case the finger is removed from the touch panel, the information processing unit 103 proceeds with the process to step S103. On the other hand, in the case the finger is not removed from the touch panel, the information processing unit 103 returns the process again to step S102.

When the process proceeds to step S103, the information processing unit 103 stores the data of the text which has been selected in step S101 in the storage unit 104 (S103). Additionally, the data that is stored in the storage unit 104 in step S103 is the data of plain text. Next, the information processing unit 103 determines based on the position information input from the position detection unit 101 and the press-down information input from the press-down detection unit 102 whether the text which has been selected in step S101 is pressed down again or not (S104).

In the case the text which has been selected in step S101 is pressed down again, the information processing unit 103 proceeds with the process to step S105. On the other hand, in the case the text which has been selected in step S101 is not pressed down, the information processing unit 103 proceeds with the process to step S106. For example, in the case an area not including the text which has been selected in step S101 is pressed down, the information processing unit 103 determines that the text which has been selected in step S101 is not pressed down, and proceeds with the process to step S106.

When the process proceeds to step S105, the information processing unit 103 saves the format of the text which has been selected in step S101 (S105). That is, the information processing unit 103 stores the data of the format in the storage unit 104. When the data of the format is stored in the storage unit 104, the information processing unit 103 proceeds with the process to step S106. The information processing unit 103 which has proceeded with the process to step S106 cancels the selected state of the text which has been selected in step S101 (S106), and ends the series of processes related to two-stage copy of text.

In the foregoing, an operation of the information processing apparatus 100 related to two-stage copy of text has been described.

(2-6-2: Two-Stage Copy+Cut of Text)

Figure 13:
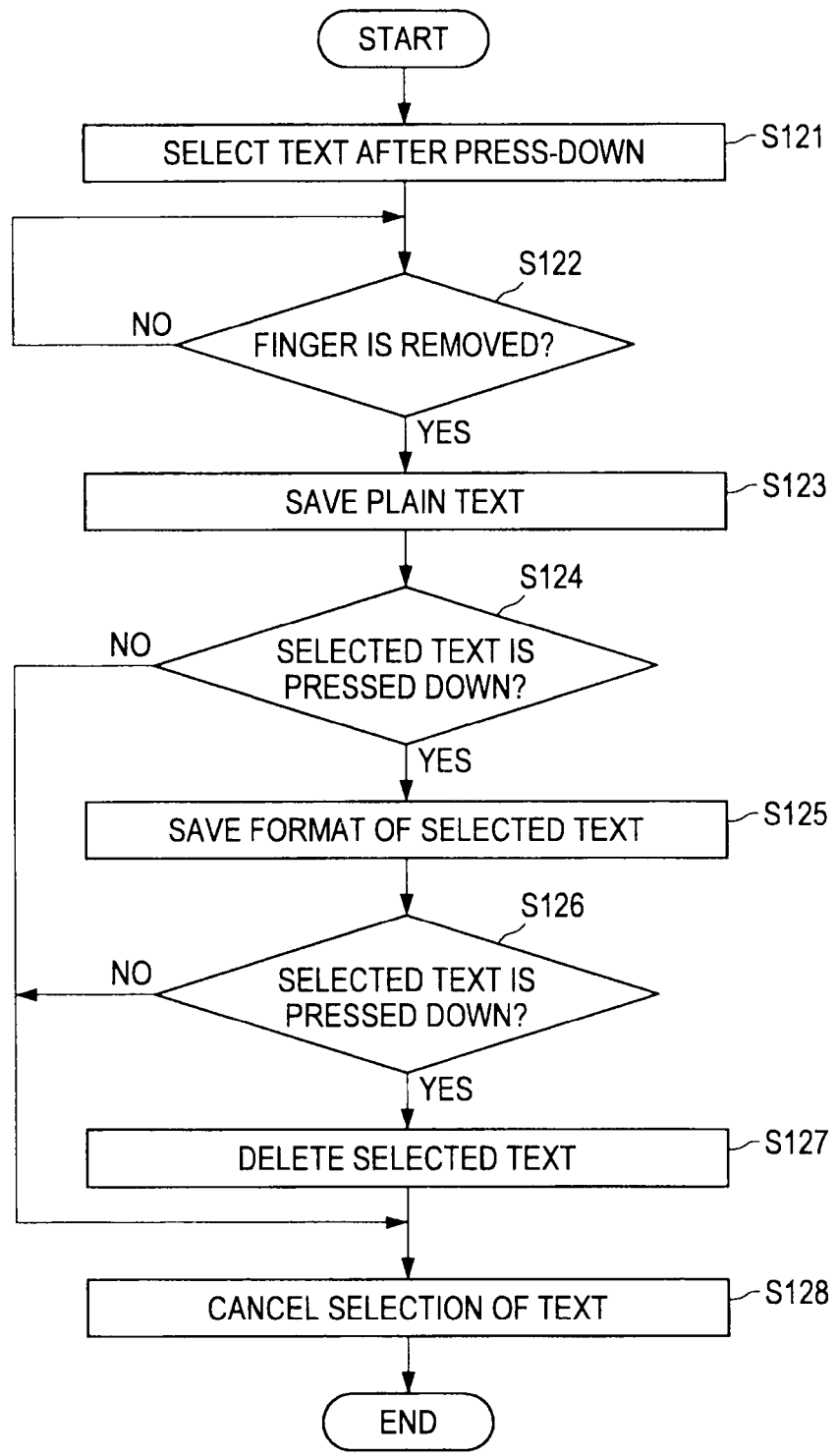
FIG. 13 is an explanatory diagram for describing an operation of the information processing apparatus according to the embodiment (two-stage copy+cut of text)

Next, an operation of the information processing apparatus 100 related to two-stage copy+cut of text will be described with reference to FIG. 13. FIG. 13 is an explanatory diagram for describing an operation of the information processing apparatus 100 related to two-stage copy+cut of text.

As shown in FIG. 13, first, a press-down operation is performed by a user, and text is selected by a drag operation (S121). At this point, the press-down operation is detected by the press-down detection unit 102, and press-down information is input to the information processing unit 103. Also, a range specified by the drag operation is detected by the position detection unit 101, and position information indicating the range is input to the information processing unit 103. Then, text within the range specified by the drag operation is selected by the information processing unit 103.

Next, the information processing unit 103 determines based on the position information input from the position detection unit 101 and the press-down information input from the press-down detection unit 102 whether the finger is removed from the touch panel or not (S122). In the case the finger is removed from the touch panel, the information processing unit 103 proceeds with the process to step S123. On the other hand, in the case the finger is not removed from the touch panel, the information processing unit 103 returns the process again to step S122.

When the process proceeds to step S123, the information processing unit 103 stores the data of the text which has been selected in step S121 in the storage unit 104 (S123). Additionally, the data that is stored in the storage unit 104 in step S123 is the data of plain text. Next, the information processing unit 103 determines based on the position information input from the position detection unit 101 and the press-down information input from the press-down detection unit 102 whether the text which has been selected in step S121 is pressed down again or not (S124).

In the case the text which has been selected in step S121 is pressed down again, the information processing unit 103 proceeds with the process to step S125. On the other hand, in the case the text which has been selected in step S121 is not pressed down, the information processing unit 103 proceeds with the process to step S128. For example, in the case an area not including the text which has been selected in step S121 is pressed down, the information processing unit 103 determines that the text which has been selected in step S121 is not pressed down, and proceeds with the process to step S128.

When the process proceeds to step S125, the information processing unit 103 saves the format of the text which has been selected in step S121 (S125). That is, the information processing unit 103 stores the data of the format in the storage unit 104. When the data of the format is stored in the storage unit 104, the information processing unit 103 proceeds with the process to step S126. The information processing unit 103 which has proceeded with the process to step S126 determines based on the position information input from the position detection unit 101 and the press-down information input from the press-down detection unit 102 whether the text which has been selected in step S121 is pressed down again or not (S126).

In the case the text which has been selected in step S121 is pressed down again, the information processing unit 103 proceeds with the process to step S127. On the other hand, in the case the text which has been selected in step S121 is not pressed down, the information processing unit 103 proceeds with the process to step S128. For example, in the case an area not including the text which has been selected in step S121 is pressed down, the information processing unit 103 determines that the text which has been selected in step S121 is not pressed down, and proceeds with the process to step S128.

When the process proceeds to step S127, the information processing unit 103 deletes the text which has been selected in step S121 from the screen (S127). The information processing unit 103 which has deleted the text from the screen proceeds with the process to step S128. The information processing unit 103 which has proceeded with the process to step S128 cancels the selected state of the text which has been selected in step S121 (S128), and ends the series of processes related to two-stage copy+cut of text.

In the foregoing, an operation of the information processing apparatus 100 related to two-stage copy+cut of text has been described.

(2-6-3: Three-Stage Copy of Text)

Figure 14:
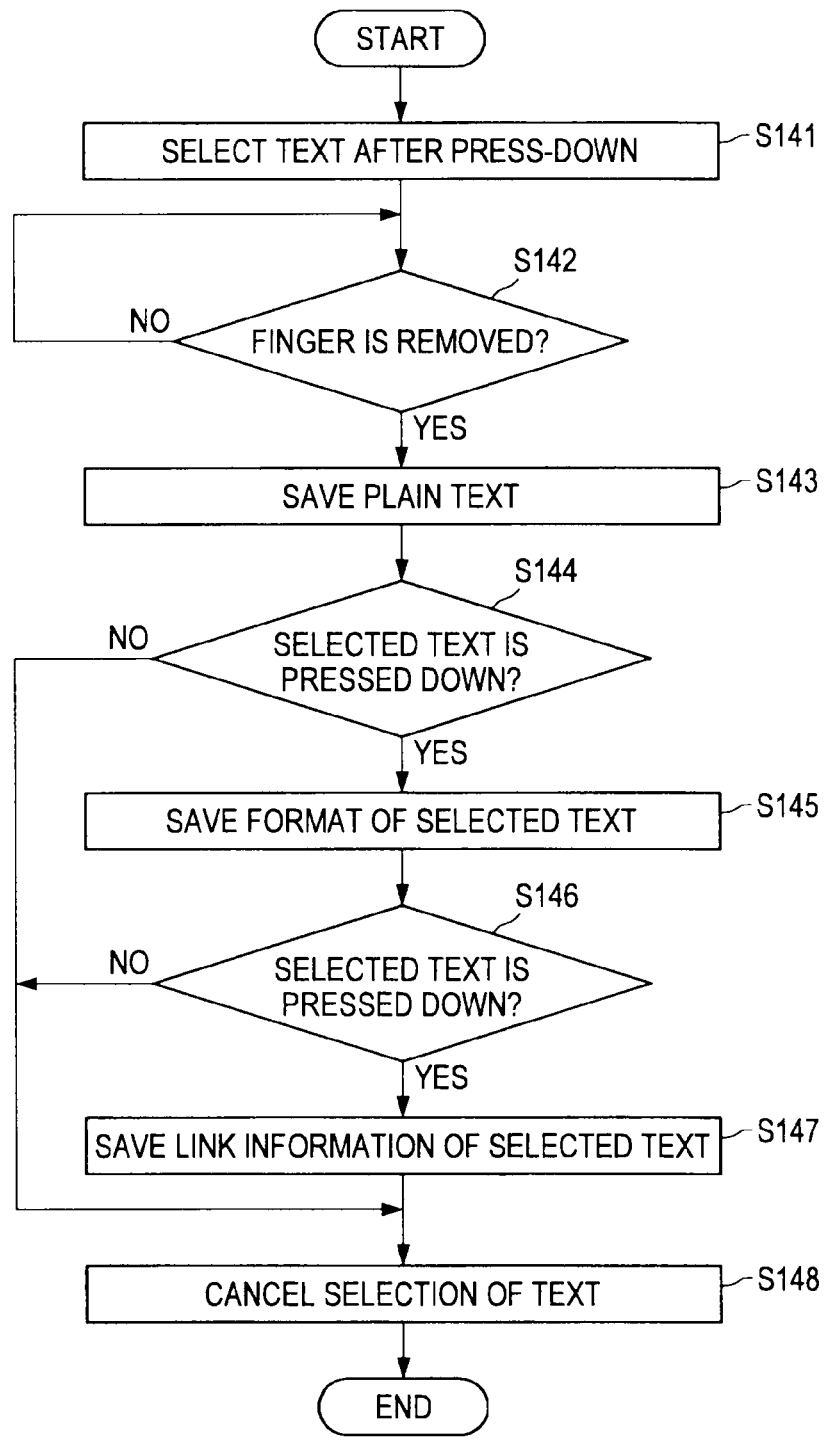
FIG. 14 is an explanatory diagram for describing of an operation of the information processing apparatus according to the embodiment (three-stage copy of text)

Next, an operation of the information processing apparatus 100 related to three-stage copy of text will be described with reference to FIG. 14. FIG. 14 is an explanatory diagram for describing an operation of the information processing apparatus 100 related to three-stage copy of text.

As shown in FIG. 14, first, a press-down operation is performed by a user, and text is selected by a drag operation (S141). At this point, the press-down operation is detected by the press-down detection unit 102, and press-down information is input to the information processing unit 103. Also, the range specified by the drag operation is detected by the position detection unit 101, and position information indicating the range is input to the information processing unit 103. Then, the text within the range specified by the drag operation is selected by the information processing unit 103.

Next, the information processing unit 103 determines based on the position information input from the position detection unit 101 and the press-down information input from the press-down detection unit 102 whether the finger is removed from the touch panel or not (S142). In the case the finger is removed from the touch panel, the information processing unit 103 proceeds with the process to step S143. On the other hand, in the case the finger is not removed from the touch panel, the information processing unit 103 returns the process again to step S142.

When the process proceeds to step S143, the information processing unit 103 stores the data of the text which has been selected in step S141 in the storage unit 104 (S143). Additionally, the data that is stored in the storage unit 104 in step S143 is the data of plain text. Next, the information processing unit 103 determines based on the position information input from the position detection unit 101 and the press-down information input from the press-down detection unit 102 whether the text which has been selected in step S141 is pressed down again or not (S144).

In the case the text which has been selected in step S141 is pressed down again, the information processing unit 103 proceeds with the process to step S145. On the other hand, in the case the text which has been selected in step S141 is not pressed down, the information processing unit 103 proceeds with the process to step S148. For example, in the case an area not including the text which has been selected in step S141 is pressed down, the information processing unit 103 determines that the text which has been selected in step S141 is not pressed down, and proceeds with the process to step S148.

When the process proceeds to step S145, the information processing unit 103 saves the format of the text which has been selected in step S141 (S145). That is, the information processing unit 103 stores the data of the format in the storage unit 104. When the data of the format is stored in the storage unit 104, the information processing unit 103 proceeds with the process to step S146. The information processing unit 103 which has proceeded with the process to step S146 determines based on the position information input from the position detection unit 101 and the press-down information input from the press-down detection unit 102 whether the text which has been selected in step S141 is pressed down again or not (S146).

In the case the text which has been selected in step S141 is pressed down again, the information processing unit 103 proceeds with the process to step S147. On the other hand, in the case the text which has been selected in step S141 is not pressed down, the information processing unit 103 proceeds with the process to step S148. For example, in the case an area not including the text which has been selected in step S141 is pressed down, the information processing unit 103 determines that the text which has been selected in step S141 is not pressed down, and proceeds with the process to step S148.

When the process proceeds to step S147, the information processing unit 103 saves link information of the text which has been selected in step S141 (S147). That is, the information processing unit 103 stores the link information that is ancillary to the text which has been selected in step S147 in the storage unit 104. The information processing unit 103 which has stored the link information in the storage unit 104 proceeds with the process to step S148. The information processing unit 103 which has proceeded with the process to step S148 cancels the selected state of the text which has been selected in step S141 (S148), and ends the series of processes related to three-stage copy of text.

In the foregoing, an operation of the information processing apparatus 100 related to three-stage copy of text has been described.

(2-6-4: Two-Stage Copy of Image 1)

Figure 15:
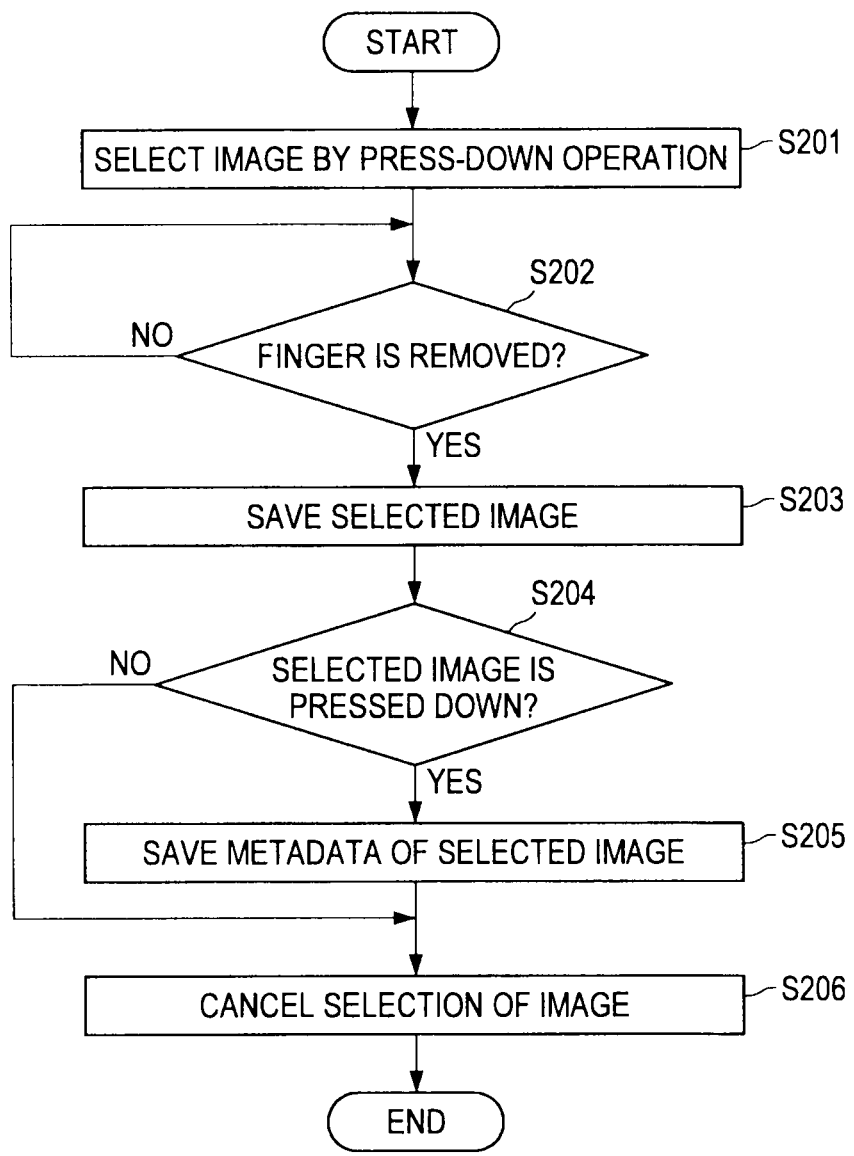
FIG. 15 is an explanatory diagram for describing an operation of the information processing apparatus according to the embodiment (two-stage copy of an image)

Next, an operation of the information processing apparatus 100 related to two-stage copy of an image (example 1) will be described with reference to FIG. 15. FIG. 15 is an explanatory diagram for describing an operation of the information processing apparatus 100 related to two-stage copy of an image.

As shown in FIG. 15, first, a press-down operation is performed by a user, and an image is selected by a drag operation (S201). At this point, the press-down operation is detected by the press-down detection unit 102, and press-down information is input to the information processing unit 103. Also, the range specified by the drag operation is detected by the position detection unit 101, and position information indicating the range is input to the information processing unit 103. Then, the image within the range specified by the drag operation is selected by the information processing unit 103.

Next, the information processing unit 103 determines based on the position information input from the position detection unit 101 and the press-down information input from the press-down detection unit 102 whether the finger is removed from the touch panel or not (S202). In the case the finger is removed from the touch panel, the information processing unit 103 proceeds with the process to step S203. On the other hand, in the case the finger is not removed from the touch panel, the information processing unit 103 returns the process again to step S202.

When the process proceeds to step S203, the information processing unit 103 stores the data of the image which has been selected in step S201 in the storage unit 104 (S203). Additionally, the data that is stored in the storage unit 104 in step S203 is the data of an image without metadata. Next, the information processing unit 103 determines based on the position information input from the position detection unit 101 and the press-down information input from the press-down detection unit 102 whether the image which has been selected in step S201 is pressed down again or not (S204).

In the case the image which has been selected in step S201 is pressed down again, the information processing unit 103 proceeds with the process to step S205. On the other hand, in the case the image which has been selected in step S201 is not pressed down, the information processing unit 103 proceeds with the process to step S206. For example, in the case an area not including the image which has been selected in step S201 is pressed down, the information processing unit 103 determines that the image which has been selected in step S201 is not pressed down, and proceeds with the process to step S206.

When the process proceeds to step S205, the information processing unit 103 saves the metadata that is ancillary to the image which has been selected in step S201 (S205). That is, the information processing unit 103 stores the metadata in the storage unit 104. When the metadata is stored in the storage unit 104, the information processing unit 103 proceeds with the process to step S206. The information processing unit 103 which has proceeded with the process to step S206 cancels the selected state of the image which has been selected in step S201 (S206), and ends the series of processes related to two-stage copy of an image.

In the foregoing, an operation of the information processing apparatus 100 related to two-stage copy of an image has been described.

(2-6-5: Two-Stage Copy of Image 2)

Figure 16:
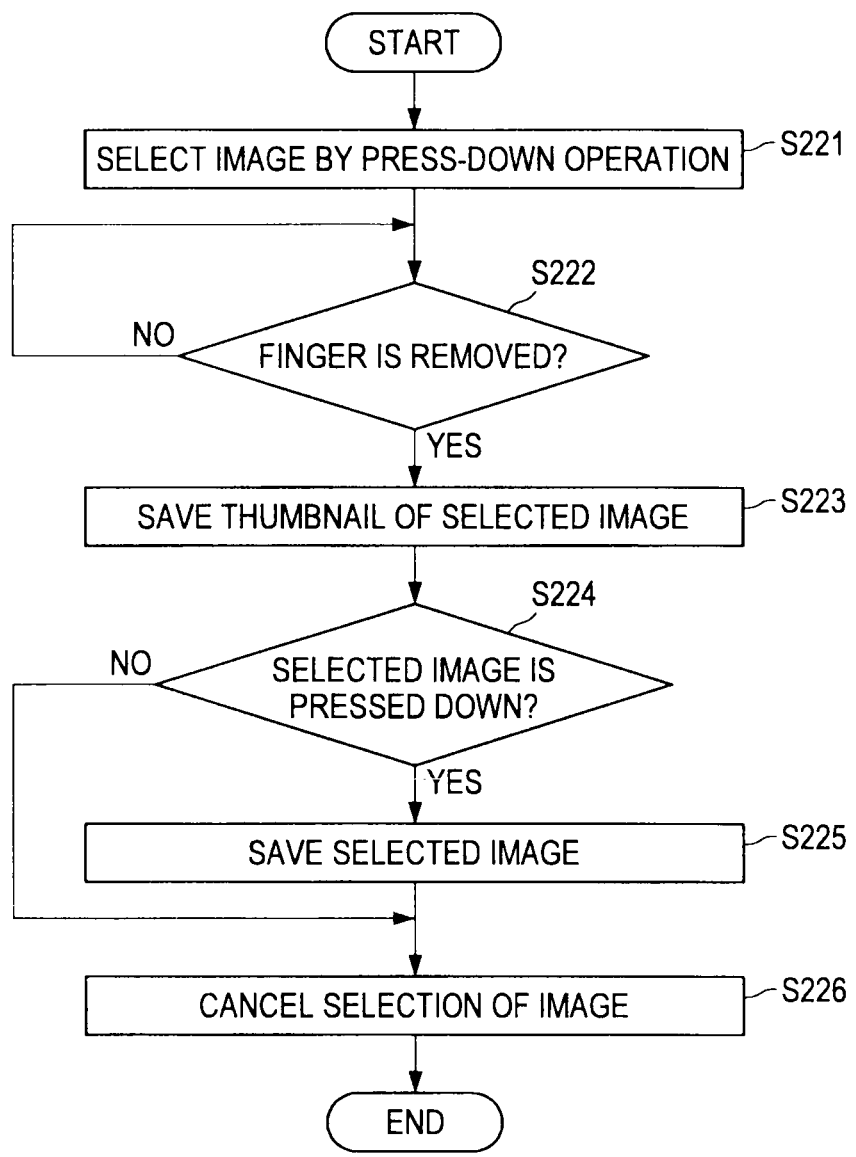
FIG. 16 is an explanatory diagram for describing an operation of the information processing apparatus according to the embodiment (two-stage copy of an image)

Next, an operation of the information processing apparatus 100 related to two-stage copy of an image (example 2) will be described with reference to FIG. 16. FIG. 16 is an explanatory diagram for describing an operation of the information processing apparatus 100 related to two-stage copy of an image.

As shown in FIG. 16, first, a press-down operation is performed by a user, and an image is selected by a drag operation (S221). At this point, the press-down operation is detected by the press-down detection unit 102, and press-down information is input to the information processing unit 103. Also, the range specified by the drag operation is detected by the position detection unit 101, and position information indicating the range is input to the information processing unit 103. Then, the image within the range specified by the drag operation is selected by the information processing unit 103.

Next, the information processing unit 103 determines based on the position information input from the position detection unit 101 and the press-down information input from the press-down detection unit 102 whether the finger is removed from the touch panel or not (S222). In the case the finger is removed from the touch panel, the information processing unit 103 proceeds with the process to step S223. On the other hand, in the case the finger is not removed from the touch panel, the information processing unit 103 returns the process again to step S222.

When the process proceeds to step S223, the information processing unit 103 stores the thumbnail of the image which has been selected in step S221 in the storage unit 104 (S223). Next, the information processing unit 103 determines based on the position information input from the position detection unit 101 and the press-down information input from the press-down detection unit 102 whether the image which has been selected in step S221 is pressed down again or not (S224).

In the case the image which has been selected in step S221 is pressed down again, the information processing unit 103 proceeds with the process to step S225. On the other hand, in the case the image which has been selected in step S221 is not pressed down, the information processing unit 103 proceeds with the process to step S226. For example, in the case an area not including the image which has been selected in step S221 is pressed down, the information processing unit 103 determines that the image which has been selected in step S221 is not pressed down, and proceeds with the process to step S226.

When the process proceeds to step S225, the information processing unit 103 saves the image which has been selected in step S221 (S225). That is, the information processing unit 103 stores the original image in the storage unit 104. When the original image is stored in the storage unit 104, the information processing unit 103 proceeds with the process to step S226. The information processing unit 103 which has proceeded with the process to step S226 cancels the selected state of the image which has been selected in step S221 (S226), and ends the series of processes related to two-stage copy of an image.

In the foregoing, an operation of the information processing apparatus 100 related to two-stage copy of an image has been described.

(2-6-6: Three-Stage Copy of Image)

Figure 17:
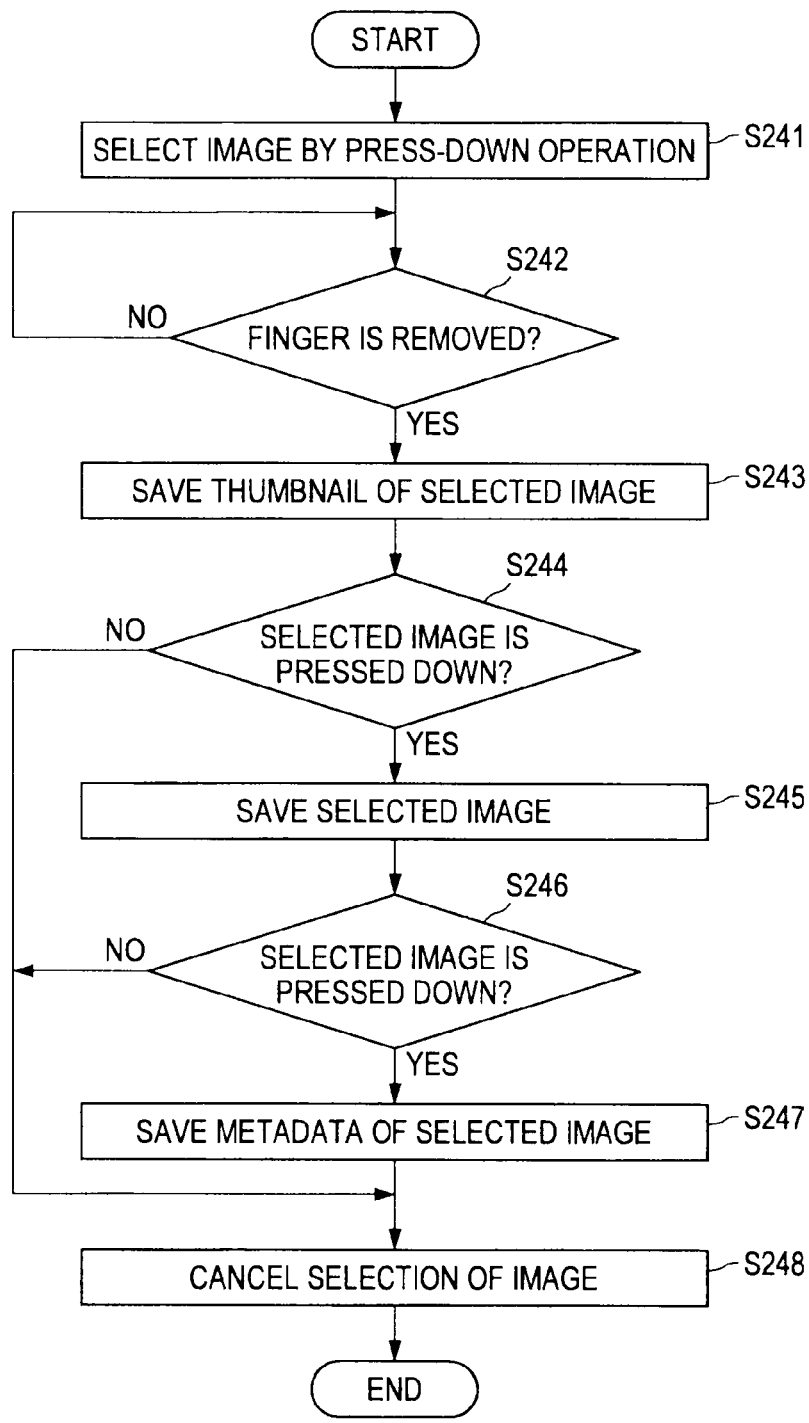
FIG. 17 is an explanatory diagram for describing an operation of the information processing apparatus according to the embodiment (three-stage copy of an image)

Next, an operation of the information processing apparatus 100 related to three-stage copy of an image will be described with reference to FIG. 17. FIG. 17 is an explanatory diagram for describing an operation of the information processing apparatus 100 related to three-stage copy of an image.

As shown in FIG. 17, first, a press-down operation is performed by a user, and an image is selected by a drag operation (S241). At this point, the press-down operation is detected by the press-down detection unit 102, and press-down information is input to the information processing unit 103. Also, the range specified by the drag operation is detected by the position detection unit 101, and position information indicating the range is input to the information processing unit 103. Then, the image within the range specified by the drag operation is selected by the information processing unit 103.

Next, the information processing unit 103 determines based on the position information input from the position detection unit 101 and the press-down information input from the press-down detection unit 102 whether the finger is removed from the touch panel or not (S242). In the case the finger is removed from the touch panel, the information processing unit 103 proceeds with the process to step S243. On the other hand, in the case the finger is not removed from the touch panel, the information processing unit 103 returns the process again to step S242.

When the process proceeds to step S243, the information processing unit 103 stores the thumbnail of the image which has been selected in step S241 in the storage unit 104 (S243). Next, the information processing unit 103 determines based on the position information input from the position detection unit 101 and the press-down information input from the press-down detection unit 102 whether the image which has been selected in step S241 is pressed down again or not (S244).

In the case the image which has been selected in step S241 is pressed down again, the information processing unit 103 proceeds with the process to step S245. On the other hand, in the case the image which has been selected in step S241 is not pressed down, the information processing unit 103 proceeds with the process to step S248. For example, in the case an area not including the image which has been selected in step S241 is pressed down, the information processing unit 103 determines that the image which has been selected in step S241 is not pressed down, and proceeds with the process to step S248.

When the process proceeds to step S245, the information processing unit 103 saves the image which has been selected in step S241 (S245). That is, the information processing unit 103 stores the original image in the storage unit 104. When the original image is stored in the storage unit 104, the information processing unit 103 proceeds with the process to step S246. The information processing unit 103 which has proceeded with the process to step S246 determines based on the position information input from the position detection unit 101 and the press-down information input from the press-down detection unit 102 whether the image which has been selected in step S241 is pressed down again or not (S246).

In the case the image which has been selected in step S241 is pressed down again, the information processing unit 103 proceeds with the process to step S247. On the other hand, in the case the image which has been selected in step S241 is not pressed down, the information processing unit 103 proceeds with the process to step S248. For example, in the case an area not including the image which has been selected in step S241 is pressed down, the information processing unit 103 determines that the image which has been selected in step S241 is not pressed down, and proceeds with the process to step S248.

When the process proceeds to step S247, the information processing unit 103 saves the metadata of the image which has been selected in step S241 (S247). That is, the information processing unit 103 stores the metadata of the image in the storage unit 104. When the metadata is stored in the storage unit 104, the information processing unit 103 proceeds with the process to step S248. The information processing unit 103 which has proceeded with the process to step S248 cancels the selected state of the image which has been selected in step S241 (S248), and ends the series of processes related to three-stage copy of an image.

In the foregoing, an operation of the information processing apparatus 100 related to three-stage copy of an image has been described.

(2-6-7: Two-Stage Paste of Text)

Figure 18:
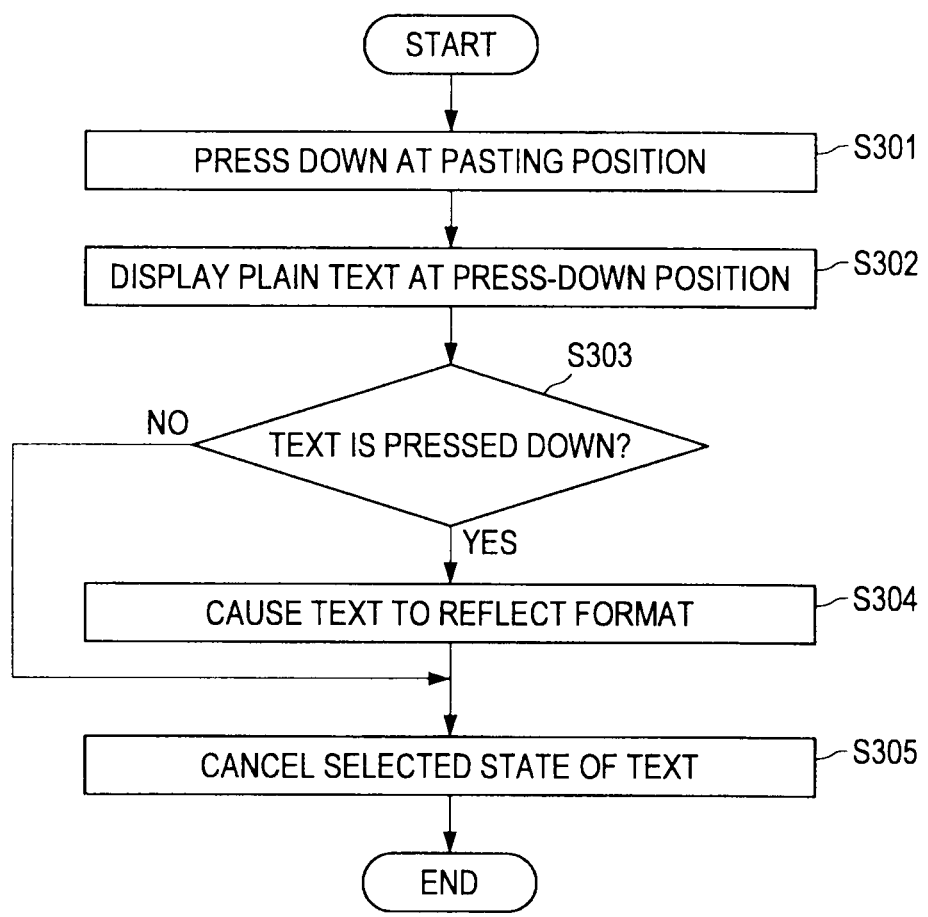
FIG. 18 is an explanatory diagram for describing an operation of the information processing apparatus according to the embodiment (two-stage paste of text)

Next, an operation of the information processing apparatus 100 related to two-stage paste of text will be described with reference to FIG. 18. FIG. 18 is an explanatory diagram for describing an operation of the information processing apparatus 100 related to two-stage paste of text.

As shown in FIG. 18, first, a press-down operation is performed by a user at a position where pasting of text is desired (S301). At this point, the press-down operation is detected by the press-down detection unit 102, and press-down information is input to the information processing unit 103. Also, position information indicating the press-down position is input to the information processing unit 103 by the position detection unit 101. When the press-down operation is performed in step S301, the information processing unit 103 causes plain text to be displayed at a position on the screen indicated by the position information input by the position detection unit 101, according to the press-down information input by the press-down detection unit 102 (S302). At this time, the information processing unit 103 displays the text in a selected state.

Next, the information processing unit 103 determines based on the position information input from the position detection unit 101 and the press-down information input from the press-down detection unit 102 whether a press-down operation is performed by the user on the text which has been displayed in step S302 or not (S303). In the case the text which has been displayed in step S302 is pressed down again, the information processing unit 103 proceeds with the process to step S304. On the other hand, in the case the text which has been displayed in step S302 is not pressed down, the information processing unit 103 proceeds with the process to step S305. For example, in a case an area not including the text which has been displayed in step S302 is pressed down, the information processing unit 103 determines that the text which has been displayed in step S302 is not pressed down, and proceeds with the process to step S305.

When the process proceeds to step S304, the information processing unit 103 causes a format to be reflected on the text (S304). That is, the information processing unit 103 reads the format of data which has been stored in the storage unit 104 in advance, and causes, based on the read data, the format to be reflected on the plain text which has been displayed in step S302. The information processing unit 103 which has caused the format to be reflected on the text proceeds with the process to step S305. The information processing unit 103 which has proceeded with the process to step S305 cancels the selected state of the text which has been displayed in step S302 (S305), and ends the series of processes related to two-stage paste of text.

In the foregoing, an operation of the information processing apparatus 100 related to two-stage paste of text has been described.

(2-6-8: Three-Stage Paste of Text)

Figure 19:
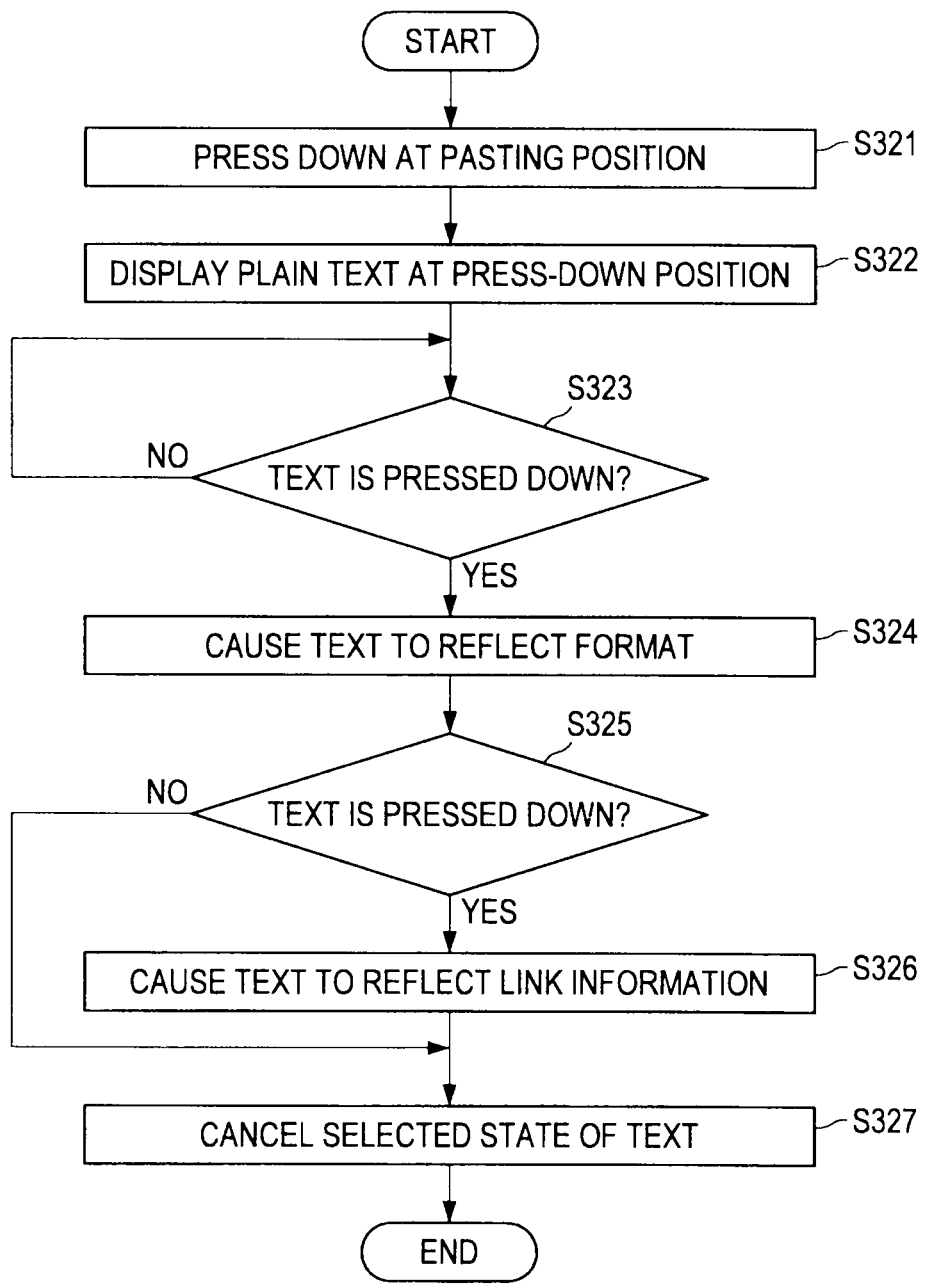
FIG. 19 is an explanatory diagram for describing an operation of the information processing apparatus according to the embodiment (three-stage paste of text)

Next, an operation of the information processing apparatus 100 related to three-stage paste of text will be described with reference to FIG. 19. FIG. 19 is an explanatory diagram for describing an operation of the information processing apparatus 100 related to three-stage paste of text.

As shown in FIG. 19, first, a press-down operation is performed by a user at a position where pasting of text is desired (S321). At this point, the press-down operation is detected by the press-down detection unit 102, and press-down information is input to the information processing unit 103. Also, position information indicating the press-down position is input to the information processing unit 103 by the position detection unit 101. When the press-down operation is performed in step S321, the information processing unit 103 causes plain text to be displayed at a position on the screen indicated by the position information input by the position detection unit 101, according to the press-down information input by the press-down detection unit 102 (S322). At this time, the information processing unit 103 displays the text in a selected state.

Next, the information processing unit 103 determines based on the position information input from the position detection unit 101 and the press-down information input from the press-down detection unit 102 whether a press-down operation is performed by the user on the text which has been displayed in step S322 or not (S323). In the case the text which has been displayed in step S322 is pressed down again, the information processing unit 103 proceeds with the process to step S324. On the other hand, in the case the text which has been displayed in step S322 is not pressed down, the information processing unit 103 proceeds with the process to step S327. For example, in a case an area not including the text which has been displayed in step S322 is pressed down, the information processing unit 103 determines that the text which has been displayed in step S322 is not pressed down, and proceeds with the process to step S327.

When the process proceeds to step S324, the information processing unit 103 causes a format to be reflected on the text (S324). That is, the information processing unit 103 reads the format of data which has been stored in the storage unit 104 in advance, and causes, based on the read data, the format to be reflected on the plain text which has been displayed in step S322. The information processing unit 103 which has caused the format to be reflected on the text proceeds with the process to step S325.

The information processing unit 103 which has proceeded with the process to step S325 determines based on the position information input from the position detection unit 101 and the press-down information input from the press-down detection unit 102 whether a press-down operation is performed by the user on the text which has been displayed in step S322 or not (S325). In the case the text which has been displayed in step S322 is pressed down again, the information processing unit 103 proceeds with the process to step S326. On the other hand, in the case the text which has been displayed in step S322 is not pressed down, the information processing unit 103 proceeds with the process to step S327. For example, in the case an area not including the text which has been displayed in step S322 is pressed down, the information processing unit 103 determines that the text which has been displayed in step S322 is not pressed down, and proceeds with the process to step S327.

The information processing unit 103 which has proceeded with the process to step S326 causes link information to be reflected on the text (S326). That is, the information processing unit 103 reads link information which has been stored in the storage unit 104 in advance, and adds the link information to the text on which the format has been reflected in step S324. The information processing unit 103 which has caused the link information to be reflected on the text proceeds with the process to step S327. The information processing unit 103 which has proceeded with the process to step S327 cancels the selected state of the text which has been displayed in step S322 (S327), and ends the series of processes related to three-stage paste of text.

In the foregoing, an operation of the information processing apparatus 100 related to three-stage paste of text has been described.

(2-6-9: Two-Stage Paste of Image 1)

Figure 20:
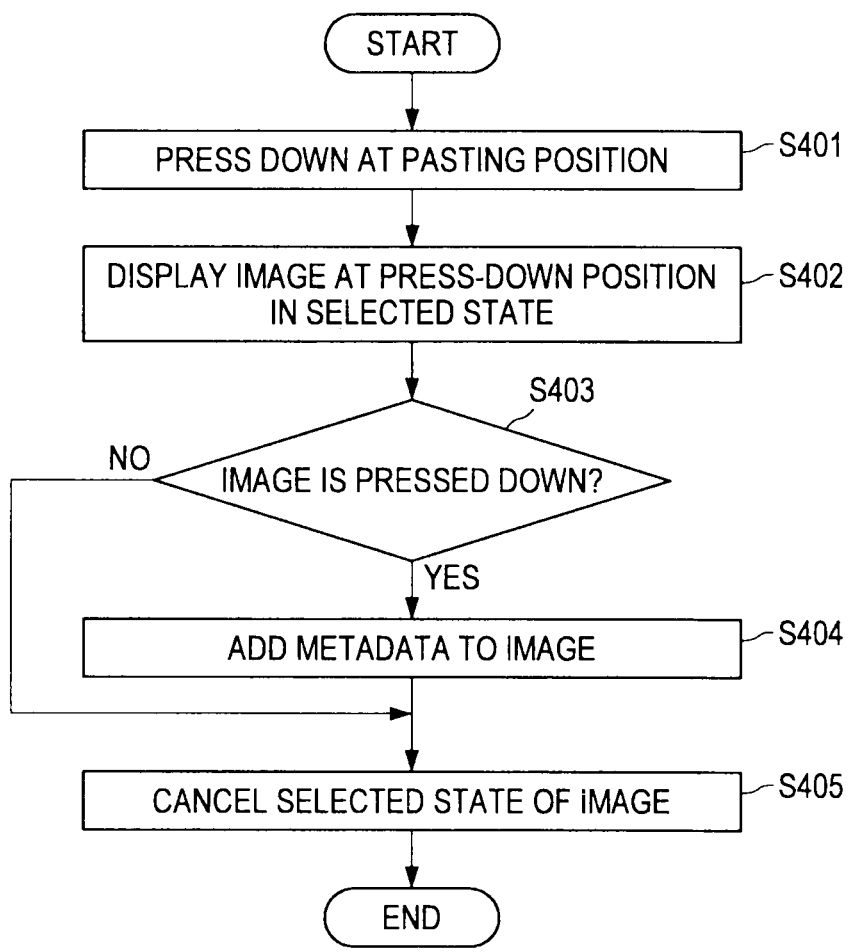
FIG. 20 is an explanatory diagram for describing an operation of the information processing apparatus according to the embodiment (two-stage paste of an image)

Next, an operation of the information processing apparatus 100 related to two-stage paste of an image (example 1) will be described with reference to FIG. 20. FIG. 20 is an explanatory diagram for describing an operation of the information processing apparatus 100 related to two-stage paste of an image.

As shown in FIG. 20, first, a press-down operation is performed by a user at a position where pasting of an image is desired (S401). At this point, the press-down operation is detected by the press-down detection unit 102, and press-down information is input to the information processing unit 103. Also, position information indicating the press-down position is input to the information processing unit 103 by the position detection unit 101. When the press-down operation is performed in step S401, the information processing unit 103 causes an image to be displayed at a position on the screen indicated by the position information input by the position detection unit 101, according to the press-down information input by the press-down detection unit 102 (S402). At this time, the information processing unit 103 displays the image in a selected state.

Next, the information processing unit 103 determines based on the position information input from the position detection unit 101 and the press-down information input from the press-down detection unit 102 whether a press-down operation is performed by the user on the image which has been displayed in step S402 or not (S403). In the case the image which has been displayed in step S402 is pressed down again, the information processing unit 103 proceeds with the process to step S404. On the other hand, in the case the image which has been displayed in step S402 is not pressed down, the information processing unit 103 proceeds with the process to step S405. For example, in a case an area not including the image which has been displayed in step S402 is pressed down, the information processing unit 103 determines that the image which has been displayed in step S402 is not pressed down, and proceeds with the process to step S405.

When the process proceeds to step S404, the information processing unit 103 adds metadata to the image (S404). That is, the information processing unit 103 reads the metadata of an image which has been stored in the storage unit 104 in advance, and adds the read metadata to the image. The information processing unit 103 which has added the metadata to the image proceeds with the process to step S405. The information processing unit 103 which has proceeded with the process to step S405 cancels the selected state of the image which has been displayed in step S402 (S405), and ends the series of processes related to two-stage paste of an image.

In the foregoing, an operation of the information processing apparatus 100 related to two-stage paste of an image has been described.

(2-6-10: Two-Stage Paste of Image 2)

Figure 21:
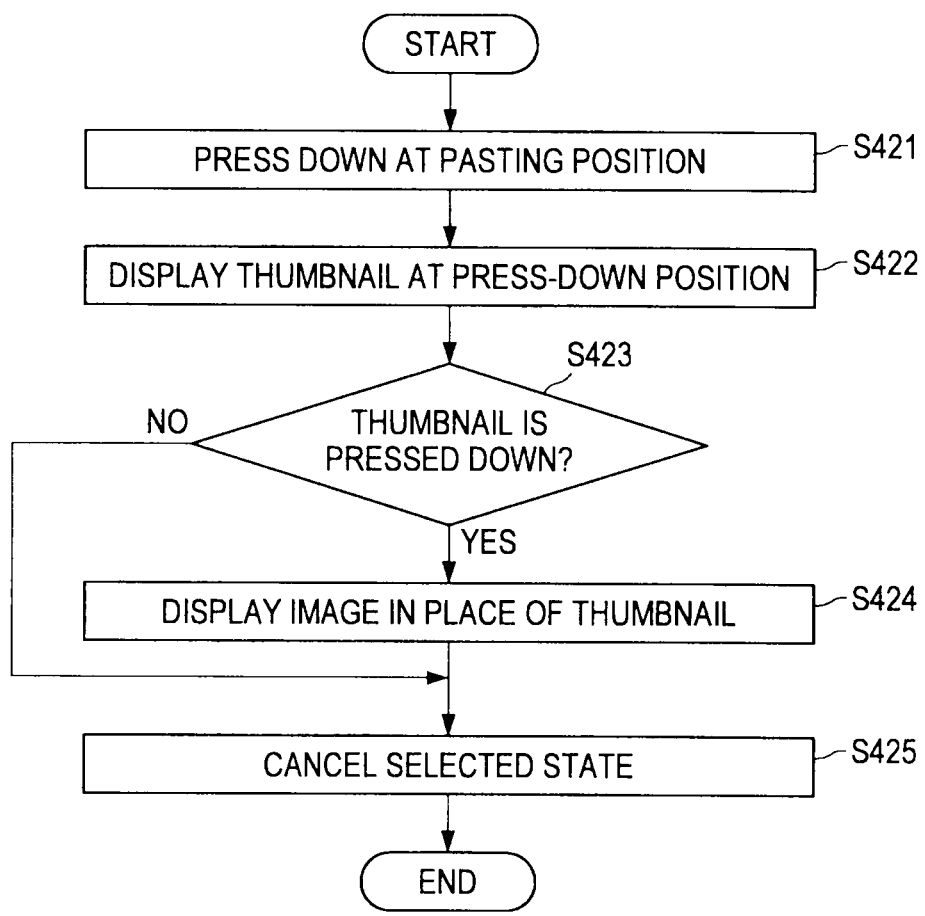
FIG. 21 is an explanatory diagram for describing an operation of the information processing apparatus according to the embodiment (two-stage paste of an image)

Next, an operation of the information processing apparatus 100 related to two-stage paste of an image (example 2) will be described with reference to FIG. 21. FIG. 21 is an explanatory diagram for describing an operation of the information processing apparatus 100 related to two-stage paste of an image.

As shown in FIG. 21, first, a press-down operation is performed by a user at a position where pasting of an image is desired (S421). At this point, the press-down operation is detected by the press-down detection unit 102, and press-down information is input to the information processing unit 103. Also, position information indicating the press-down position is input to the information processing unit 103 by the position detection unit 101. When the press-down operation is performed in step S421, the information processing unit 103 causes a thumbnail to be displayed at a position on the screen indicated by the position information input by the position detection unit 101, according to the press-down information input by the press-down detection unit 102 (S422). At this time, the information processing unit 103 displays the thumbnail in a selected state.

Next, the information processing unit 103 determines based on the position information input from the position detection unit 101 and the press-down information input from the press-down detection unit 102 whether a press-down operation is performed by the user on the thumbnail which has been displayed in step S422 or not (S423). In the case the thumbnail which has been displayed in step S422 is pressed down again, the information processing unit 103 proceeds with the process to step S424. On the other hand, in the case the thumbnail which has been displayed in step S422 is not pressed down, the information processing unit 103 proceeds with the process to step S425. For example, in a case an area not including the thumbnail which has been displayed in step S422 is pressed down, the information processing unit 103 determines that the thumbnail which has been displayed in step S422 is not pressed down, and proceeds with the process to step S425.

When the process proceeds to step S424, the information processing unit 103 replaces the thumbnail which has been displayed in step S422 by the original image (S424). That is, the information processing unit 103 reads the original image which has been stored in the storage unit 104 in advance, and causes the original image that is read to be displayed in place of the thumbnail. At this point, the information processing unit 103 displays the original image in a selected state. The information processing unit 103 which has displayed the original image proceeds with the process to step S425. The information processing unit 103 which has proceeded with the process to step S425 cancels the selected state of the thumbnail which has been displayed in step S422 or the image which has been displayed in step S424 (S425), and ends the series of processes related to two-stage paste of an image.

In the foregoing, an operation of the information processing apparatus 100 related to two-stage paste of an image has been described.

(2-6-11: Three-Stage Paste of Image)

Figure 22:
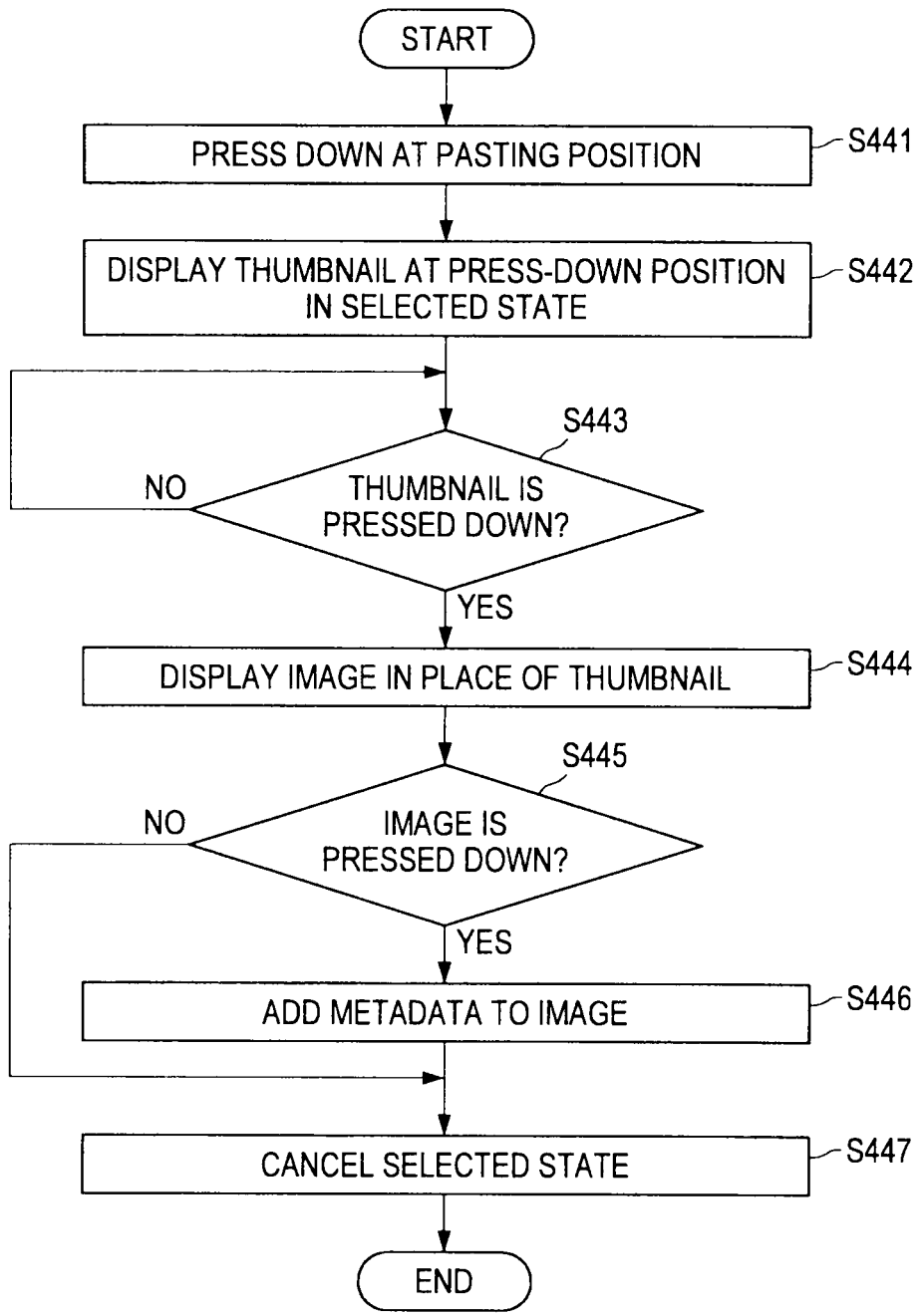
FIG. 22 is an explanatory diagram for describing an operation of the information processing apparatus according to the embodiment (three-stage paste of an image)

Next, an operation of the information processing apparatus 100 related to three-stage paste of an image will be described with reference to FIG. 22. FIG. 22 is an explanatory diagram for describing an operation of the information processing apparatus 100 related to three-stage paste of an image.

As shown in FIG. 22, first, a press-down operation is performed by a user at a position where pasting of an image is desired (S441). At this point, the press-down operation is detected by the press-down detection unit 102, and press-down information is input to the information processing unit 103. Also, position information indicating the press-down position is input to the information processing unit 103 by the position detection unit 101. When the press-down operation is performed in step S441, the information processing unit 103 causes a thumbnail to be displayed at a position on the screen indicated by the position information input by the position detection unit 101, according to the press-down information input by the press-down detection unit 102 (S442). At this time, the information processing unit 103 displays the thumbnail in a selected state.

Next, the information processing unit 103 determines based on the position information input from the position detection unit 101 and the press-down information input from the press-down detection unit 102 whether a press-down operation is performed by the user on the thumbnail which has been displayed in step S442 or not (S443). In the case the thumbnail which has been displayed in step S442 is pressed down again, the information processing unit 103 proceeds with the process to step S444. On the other hand, in the case the thumbnail which has been displayed in step S442 is not pressed down, the information processing unit 103 proceeds with the process to step S447. For example, in a case an area not including the thumbnail which has been displayed in step S442 is pressed down, the information processing unit 103 determines that the thumbnail which has been displayed in step S442 is not pressed down, and proceeds with the process to step S447.

When the process proceeds to step S444, the information processing unit 103 replaces the thumbnail which has been displayed in step S442 by the original image (S444). That is, the information processing unit 103 reads the original image which has been stored in the storage unit 104 in advance, and causes the original image that is read to be displayed instead of the thumbnail. At this point, the information processing unit 103 displays the original image in a selected state. The information processing unit 103 which has displayed the original image proceeds with the process to step S445.

The information processing unit 103 which has proceeded with the process to step S445 determines based on the position information input from the position detection unit 101 and the press-down information input from the press-down detection unit 102 whether a press-down operation is performed by the user on the image which has been displayed in step S444 or not (S445). In the case the image which has been displayed in step S444 is pressed down again, the information processing unit 103 proceeds with the process to step S446. On the other hand, in the case the image which has been displayed in step S444 is not pressed down, the information processing unit 103 proceeds with the process to step S447. For example, in the case an area not including the image which has been displayed in step S444 is pressed down, the information processing unit 103 determines that the image which has been displayed in step S444 is not pressed down, and proceeds with the process to step S447.

When the process proceeds to step S446, the information processing unit 103 adds metadata to the image (S446). That is, the information processing unit 103 reads the metadata of image which has been stored in the storage unit 104 in advance, and adds the read metadata to the image. The information processing unit 103 which has added the metadata to the image proceeds with the process to step S447. The information processing unit 103 which has proceeded with the process to step S447 cancels the selected state of the thumbnail which has been displayed in step S442 or the image which has been displayed in step S444 (S447), and ends the series of processes related to three-stage paste of an image.

In the foregoing, an operation of the information processing apparatus 100 related to three-stage paste of an image has been described.

In the foregoing, operations of the information processing apparatus 100 according to the present embodiment have been described. Copy and paste operations of text and image have been concretely described in the above, but copy and paste operations of other types of data can also be realized by the same methods.

[2-7: Hardware Configuration]

The function of each structural element of the information processing apparatus 100 described above can be realised by using, for example, the hardware configuration of the information processing apparatus shown in FIG. 23. That is, the function of each structural element can be realized by controlling the hardware shown in FIG. 23 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 23, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for various types of communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

3: Summary

Lastly, the technical contents according to the embodiment of the present disclosure will be briefly described. The technical contents stated here can be applied to various information processing apparatuses such as a personal computer, a mobile phone, a portable game machine, a portable information terminal, an information appliance or a car navigation system, for example.

The functional configuration of the information processing apparatus described above can be expressed as below. This information processing apparatus includes a press-down detection unit and an information processing unit as below. The press-down detection unit is for detecting a press-down operation. Also, the information processing unit is for performing, in a case a plurality of press-down operations are successively detected by the press-down detection unit in a state where first information and second information related to the first information are held, a paste operation of the first information by a first press-down operation and processing according to the second information by a second press-down operation following the first operation.

For example, the first information is text, and the second information is a format. In this case, the text is pasted by the first press-down operation, and the format is reflected on the text by the second press-down operation. In this manner, the information processing apparatus described above is capable of processing a plurality of pieces of related information in stages according to press-down operations that are successively performed. That is, by using this information processing apparatus, a plurality of pieces of related information can be processed in stages by a series of operations that can be successively performed and that include a small number of operational steps. As a result, the operability of the information processing apparatus equipped with input means such as a touch panel is further improved.

(Notes)

The storage unit 104 is an example of an information holding unit.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-187370 filed in the Japan Patent Office on Aug. 24, 2010, the entire content of which is hereby incorporated by reference.

What is claimed is:

1. An information processing apparatus comprising:
a non-transitory computer-readable storage medium storing instructions thereon, which, when executed by a processor, cause the information processing apparatus to detect a press-down operation on a touch panel; and
perform, when a plurality of press-down operations are successively detected in a state where first information and second information related to the first information are held, a paste operation of the first information by a first press-down operation and processing according to the second information by a second press-down operation at a position of the pasted first information following the first press-down operation, wherein
the second information is image data and the first information is thumbnail data of the image data, and the instructions cause, by the first press-down operation, the held thumbnail data to be pasted, and replaces, by the second press-down operation following the first operation, the pasted thumbnail data by deleting the pasted thumbnail data and pasting the held image data at a position of the deleted thumbnail data.

2. The information processing apparatus according to claim 1,
wherein the circuitry performs, by a (k+1)-th press-down operation following a k-th (k≥2) operation, predetermined processing according to (k+1)-th information related to the first information.

3. An information processing method performed by an information processing apparatus including circuitry configured to detect a press-down operation, comprising:
performing, when a plurality of press-down operations are successively detected by the circuitry in a state where first information and second information related to the first information are held, a paste operation of the first information by a first press-down operation and processing according to the second information by a second press-down operation at a position of the pasted first information following the first press-down operation, wherein
the second information is image data and the first information is thumbnail data of the image data, and
the performing includes causing, by the first press-down operation, the held thumbnail data to be pasted, and replacing, by the second press-down operation following the first operation, the pasted thumbnail data by deleting the pasted thumbnail data and pasting the held image data at a position of the deleted thumbnail data.

4. A non-transitory computer-readable storage medium storing computer-readable instructions thereon, which, when executed by a computer, cause the computer to perform a method comprising:
detecting a press-down operation; and
performing, when a plurality of press-down operations are successively detected by the detecting in a state where first information and second information related to the first information are held, a paste operation of the first information by a first press-down operation and processing according to the second information by a second press-down operation at a position of the pasted first information following the first press-down operation, wherein
the second information is image data and the first information is thumbnail data of the image data, and
the performing includes causing, by the first press-down operation, the held thumbnail data to be pasted, and replacing, by the second press-down operation following the first operation, the pasted thumbnail data by deleting the pasted thumbnail data and pasting the held image data at a position of the deleted thumbnail data.

* * * * *